(12) United States Patent
de Mersseman et al.

(10) Patent No.: US 10,416,292 B2
(45) Date of Patent: Sep. 17, 2019

(54) DIRECT DETECTION LIDAR SYSTEM AND METHOD WITH FREQUENCY MODULATION (FM) TRANSMITTER AND QUADRATURE RECEIVER

(71) Applicant: Veoneer US, Inc., Southfield, MI (US)

(72) Inventors: Bernard de Mersseman, Andover, MA (US); Kenneth V. Puglia, Westford, MA (US)

(73) Assignee: VEONEER US, INC., Southfield, MI (US)

( * ) Notice: Subject to any disclaimer, the term of this patent is extended or adjusted under 35 U.S.C. 154(b) by 318 days.

(21) Appl. No.: 15/264,830

(22) Filed: Sep. 14, 2016

(65) Prior Publication Data
US 2017/0343652 A1    Nov. 30, 2017

Related U.S. Application Data
(60) Provisional application No. 62/340,758, filed on May 24, 2016.

(51) Int. Cl.
*G01S 7/48* (2006.01)
*G01S 7/484* (2006.01)
(Continued)

(52) U.S. Cl.
CPC ............ *G01S 7/484* (2013.01); *G01S 7/4861* (2013.01); *G01S 7/493* (2013.01); *G01S 7/4911* (2013.01);
(Continued)

(58) Field of Classification Search
CPC .......... G01S 17/00; G01S 17/10; G01S 17/36; G01S 15/10; G01S 13/10; G01S 13/36; G01S 15/36; G01S 13/00; G01S 15/00
See application file for complete search history.

(56) References Cited

U.S. PATENT DOCUMENTS

| 3,712,985 A | 1/1973 | Swarner et al. |
| 4,184,154 A | 1/1980 | Albanese et al. |
| (Continued) | | |

FOREIGN PATENT DOCUMENTS

| AT | 509180 B1 | 1/2016 |
| DE | 19757840 C1 | 9/1999 |
| (Continued) | | |

OTHER PUBLICATIONS

Marc L. Simpson, et al., "Intensity-modulated, stepped frequency cw lidar for distributed aerosol and hard target measurements," Applied Optics, vol. 44, No. 33; Nov. 20, 2005.
(Continued)

*Primary Examiner* — Luke D Ratcliffe
(74) *Attorney, Agent, or Firm* — Steven M. Mills; Burns & Levinson LLP

(57) ABSTRACT

A LiDAR system and method include a signal generator generating an output signal having a variable frequency. A modulation circuit receives the output signal from the signal generator and applies the output signal from the signal generator to an optical signal to generate an envelope-modulated optical signal having a frequency-modulated (FM) modulation envelope. Optical transmission elements transmit the envelope-modulated optical signal into a region. Optical receiving elements receive reflected optical signals from the region. Receive signal processing circuitry receives the reflected optical signals and uses quadrature detection to process the reflected optical signals.

16 Claims, 20 Drawing Sheets

(51) Int. Cl.
*G01S 17/32* (2006.01)
*G01S 17/58* (2006.01)
*G01S 17/93* (2006.01)
*G01S 7/491* (2006.01)
*G01S 7/493* (2006.01)
*G01S 7/486* (2006.01)
*G01S 17/02* (2006.01)

(52) U.S. Cl.
CPC .......... *G01S 7/4912* (2013.01); *G01S 17/026* (2013.01); *G01S 17/32* (2013.01); *G01S 17/58* (2013.01); *G01S 17/936* (2013.01)

(56) References Cited

U.S. PATENT DOCUMENTS

| | | | |
|---|---|---|---|
| 4,439,766 | A | 3/1984 | Kobayashi et al. |
| 4,957,362 | A | 9/1990 | Peterson |
| 5,210,586 | A | 5/1993 | Grage et al. |
| 5,274,379 | A | 12/1993 | Carbonneau |
| 5,428,215 | A | 6/1995 | Dubois et al. |
| 5,604,695 | A | 2/1997 | Cantin et al. |
| 5,793,491 | A | 8/1998 | Wangler et al. |
| 5,889,490 | A * | 3/1999 | Wachter ............... G01S 17/10 342/127 |
| 5,966,226 | A | 10/1999 | Gerber |
| 6,559,932 | B1 | 5/2003 | Halmos |
| 7,227,116 | B2 | 6/2007 | Gleckler |
| 7,272,271 | B2 | 9/2007 | Kaplan et al. |
| 7,440,084 | B2 | 10/2008 | Kane |
| 7,483,600 | B2 | 1/2009 | Achiam et al. |
| 8,508,723 | B2 | 8/2013 | Chang et al. |
| 8,629,975 | B1 | 1/2014 | Dierking et al. |
| 8,742,325 | B1 | 6/2014 | Droz et al. |
| 8,836,922 | B1 | 9/2014 | Pennecot |
| 9,063,549 | B1 | 6/2015 | Pennecot et al. |
| 9,086,273 | B1 | 7/2015 | Gruver et al. |
| 9,090,213 | B2 | 7/2015 | Lawlor et al. |
| 9,097,646 | B1 | 8/2015 | Campbell et al. |
| 9,267,787 | B2 | 2/2016 | Shpunt et al. |
| 9,285,477 | B1 | 3/2016 | Smith et al. |
| 9,575,162 | B2 | 2/2017 | Owechko |
| 9,618,742 | B1 | 4/2017 | Droz et al. |
| 9,869,754 | B1 | 1/2018 | Campbell et al. |
| 2001/0052872 | A1 | 12/2001 | Hahlweg |
| 2004/0135992 | A1 | 7/2004 | Munro |
| 2006/0221250 | A1 | 10/2006 | Rossbach et al. |
| 2007/0181810 | A1 | 8/2007 | Tan et al. |
| 2008/0088499 | A1 | 4/2008 | Bonthron et al. |
| 2008/0219584 | A1 * | 9/2008 | Mullen ................ G01S 7/491 382/264 |
| 2008/0246944 | A1 | 10/2008 | Redman et al. |
| 2009/0002680 | A1 * | 1/2009 | Ruff .................. G01S 17/325 356/5.09 |
| 2009/0010644 | A1 | 1/2009 | Varshneya |
| 2009/0190007 | A1 | 7/2009 | Oggier |
| 2010/0157280 | A1 | 6/2010 | Kusevic et al. |
| 2010/0182874 | A1 | 7/2010 | Frank et al. |
| 2012/0236379 | A1 | 9/2012 | da Silva et al. |
| 2012/0310516 | A1 | 12/2012 | Zeng |
| 2013/0093584 | A1 | 4/2013 | Schumacher |
| 2013/0120760 | A1 | 5/2013 | Raguin et al. |
| 2013/0206967 | A1 | 8/2013 | Shpunt et al. |
| 2013/0207970 | A1 | 8/2013 | Shpunt et al. |
| 2014/0036252 | A1 * | 2/2014 | Amzajerdian ........ G01S 17/325 356/28 |
| 2014/0152975 | A1 * | 6/2014 | Ko ..................... G01S 17/89 356/5.01 |
| 2014/0168631 | A1 | 6/2014 | Haslim |
| 2015/0260843 | A1 | 9/2015 | Lewis |
| 2015/0371074 | A1 | 12/2015 | Lin |
| 2015/0378011 | A1 | 12/2015 | Owechko |
| 2016/0047895 | A1 | 2/2016 | Dussan |
| 2016/0178749 | A1 | 6/2016 | Lin et al. |
| 2016/0245902 | A1 | 8/2016 | Watnik et al. |
| 2016/0291160 | A1 | 10/2016 | Zweigle et al. |
| 2016/0357187 | A1 | 12/2016 | Ansari |
| 2016/0363669 | A1 | 12/2016 | Liu |
| 2016/0380488 | A1 | 12/2016 | Widmer |
| 2017/0090013 | A1 | 3/2017 | Paradie et al. |
| 2017/0269215 | A1 | 9/2017 | Hall et al. |
| 2017/0307736 | A1 | 10/2017 | Donovan |
| 2018/0241477 | A1 | 8/2018 | Turbide et al. |

FOREIGN PATENT DOCUMENTS

| | | |
|---|---|---|
| DE | 102004033944 A1 | 2/2006 |
| DE | 102006031114 A1 | 1/2008 |
| DE | 102015217908 A1 | 3/2017 |
| EP | 0112188 A2 | 6/1984 |
| EP | 0578129 A2 | 1/1994 |
| EP | 2696166 A2 | 2/2014 |
| EP | 2824418 A1 | 1/2015 |
| EP | 3147685 A1 | 3/2017 |
| EP | 3203259 A1 | 8/2017 |
| WO | 1994019705 A1 | 9/1994 |
| WO | 2008/008970 A2 | 1/2008 |
| WO | 2015/014556 A2 | 2/2015 |
| WO | 2016/097409 A2 | 6/2016 |

OTHER PUBLICATIONS

International Search Report and Written Opinion in corresponding PCT Application No. PCT/US2017/033265, International Filing Date May 18, 2017; dated Sep. 1, 2017.
Invitation to Pay Additional Fees dated Mar. 8, 2019 in PCT/US2018/052849.
Kasturi et al., UAV-Borne LiDAR with MEMS Mirror Based Scanning Capability; SPIE Defense and Commercial Sensing Conference 2016; Apr. 20, 2016; Baltimore, MD; 10 pages.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/inks/5839add708ae3a74b49ea03b/The-Geometry-of-Airborne-Laser-Scanning-in-a-Kinematical-Framework.pdf.
Internet URL: http://www.advancedscientificconcepts.com/products/overview.html [retrieved on Dec. 20. 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.
Hewlett-Packard Application Note 77-4, Swept-Frequency Group Delay Measurements, Hewlett-Packard Co., Sep. 1968, 7 pages.
Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.
Journet et al., A Low-Cost Laser Range Finder Based on an FMCW-like Method, IEEE Transactions on Instrumentation and Measurement, Aug. 2000, vol. 49, No. 4, pp. 840-843.
Campbell et al., Advanced Sine Wave Modulation of Continuous Wave Laser System for Atmospheric $CO_2$ Differential Absorption Measurements; NASA Langley Research Center; 32 pages [retrieved on Dec. 20, 2018].

(56) References Cited

OTHER PUBLICATIONS

Levanon et al., Non-coherent Pulse Compression—Aperiodic and Periodic Waveforms; The Institution of Engineering and Technology, 2015; 9 pages.
Peer et al., Compression Waveforms for Non-Coherent Radar, Tel Aviv University; 6 pages [retrieved on Dec. 20, 2018].
Li, Larry, Time-of-Flight Camera—An Introduction, Technical White Paper, SLOA190B, Texas Instruments; Jan. 2014; 10 pages.
Pierrottet et al., Linear FMCW Laser Radar for Precision Range and Vector Velocity Measurements, Coherent Applications, Inc.; NASA Langley Research Center; 9 pages [retrieved on Dec. 20, 2018].
Kahn, Joseph M., Modulation and Detection Techniques for Optical Communication Systems, Stanford University, Department of Electrical Engineering, 2006; 3 pages.
Niclass et al., Development of Automotive LIDAR, Electronics and Communications in Japan, vol. 98, No. 5, 2015; 6 pages.
International Search Report and Written Opinion in corresponding PCT Application No. PCT/US2017/033271, International Filing Date May 18, 2017; dated Sep. 1, 2017.
Su et al, 2-D FFT and Time-Frequency Analysis Techniques for Multi-Target Recognition of FMCW Radar Signal, Proceedings of the Asia-Pacific Microwave Conference 2011, p. 1390-1393.
Wojtkiewicz et al, Two-Dimensional Signal Processing in FMCW Radars, Instytut Podstaw Elektroniki Politechnika Narszawska, Warszawa; 6 pages [retreived on Dec. 20, 2018].
Winkler, Volker, Range Doppler Detection for Automotive FMCW Radars, Proceedings of the 4th European Radar Conference, Oct. 2007, Munich Germany; 4 pages.
Li et al., Investigation of Beam Steering Performances in Rotation Risley-Prism Scanner, Optics Express, Jun. 13, 2016, vol. 24, No. 12; 11 pages.
THORLABS Application Note, Risley Prism Scanner; 33 pages [retrieved on Dec. 20, 2018].
International Search Report and Written Opinion in corresponding International Application No. PCT/US2017/033263, dated Aug. 29, 2017; 13 pages.
International Search Report and Written Opinion in corresponding International Application No. PCT/US2018/054992, dated Dec. 11, 2018; 12 pages.
International Search Report and Written Opinion in corresponding International Application No. PCT/US2018/049038, dated Dec. 12, 2018; 13 pages.
International Search Report and Written Opinion in corresponding International Application No. PCT/US2018/057727, dated Jan. 28, 2019; 12 pages.
International Search Report and Written Opinion in corresponding International Application No. PCT/US2018/052837, dated Jan. 24, 2019; 13 pages.
Skolnik, M.I., Introduction to Radar Systems, 3rd Edition, pp. 45-48, McGraw-Hill, New York, NY 2001; 6 pages.
Range-Doppler image processing in linear FMCW Radar and FPGA Based Real-Time Implementation, Journal of Communication and Computer, vol. 6, No. 4, Apr. 2009.
International Search Report and Written Opinion in corresponding International Application No. PCT/US2018/048869, dated Nov. 8, 2018; 14 pages.
International Search Report and Written Opinion in corresponding International Application No. PCT/US2018/051281, dated Nov. 22, 2018; 14 pages.

* cited by examiner

FMCW I/Q LiDAR Parametric Data Summary

| Parameter | Symbol | Value | Units | Note/Comment |
|---|---|---|---|---|
| Frequency Deviation | $\Delta F$ | 128 | MHz | |
| Time Interval / Ramp Time | $\Delta T$ | 128 | usec | |
| Nominal Modulation Frequency | $f_m$ | 1000 | MHz | $\lambda_m = 0.30$ meter |
| Sample Rate, Range | $f_{sR}$ | $2.0 \cdot 10^6$ | SPS | $f_{sR} = N/\Delta T$ |
| Sample Rate, Doppler | $f_{sD}$ | $7.8125 \cdot 10^3$ | SPS | $f_{sD} = 1/\Delta T$ |
| Maximum Range | $R_{max}$ | 150 | meter | |
| Range Resolution | $\delta R$ | 1.2 | meter | $\delta R = c/2 \cdot \Delta F$ |
| Number of Range Samples | $N$ | 256 | - | |
| Range Bandwidth | $B_{wR}$ | 7812.5 | Hz | $B_{wR} = f_{sR}/N$ |
| Number of Doppler Samples | $M$ | 128 | - | |
| Doppler Bandwidth | $B_{wD}$ | 61.0 | Hz | $B_{wD} = f_{sD}/M$ |
| Maximum Closing Velocity | $v_{max}$ | 70 | meter/sec | 70 meter/sec $\Rightarrow$ 250 kph |
| Maximum Doppler Frequency | $f_{D\_max}$ | 466 | Hz | $f_{d\_max} = 2 \cdot v_{max}/\lambda_m$ |
| Target Dwell Time | $T_{dw}$ | 16.7 | msec | single range bin |
| Data Acquisition Time | $T_{acq}$ | 16.4 | msec | $T_{acq} = M \cdot \Delta T$ |
| Process Gain, Range FFT | $PG_{R\_dB}$ | 24.1 | dB | $10 \cdot \log(N)$ (estimate) |
| Process Gain, Doppler FFT | $PG_{D\_dB}$ | 21.1 | dB | $10 \cdot \log(M)$ (estimate) |
| Data Matrix Dimension | $M \times N$ | 128 x 256 | - | |

*Fig. 18*

DIRECT DETECTION LIDAR SYSTEM AND METHOD WITH FREQUENCY MODULATION (FM) TRANSMITTER AND QUADRATURE RECEIVER

RELATED APPLICATION

This application claims the benefit of U.S. Provisional Patent Application No. 62/340,758, filed in the United States Patent and Trademark Office on May 24, 2016, the entire contents of which are incorporated herein by reference.

BACKGROUND

1. Technical Field

The present disclosure is related to LiDAR systems and, in particular, to a direct detection LiDAR system and method with a frequency-modulation (FM) transmitter and a quadrature receiver, which can be used in an automotive or other motor vehicle application.

2. Discussion of Related Art

LiDAR is commonly referred to as an acronym for light detection and ranging, in the sense that LiDAR is commonly considered an optical analog to radar. In general, there are two types of LiDAR systems, namely, incoherent LiDAR and coherent LiDAR. Incoherent LiDAR, also commonly referred to as direct detection or direct energy detection LiDAR, primarily uses an amplitude measurement in light returns, while coherent LiDAR is better suited for phase-sensitive measurements or other more sophisticated transmitter waveform modulation techniques. Coherent systems generally use optical heterodyne detection, which, being more sensitive than direct detection, allows them to operate at a much lower power and provide greater measurement accuracy and resolution, but at the expense of more complex transceiver requirements and cost.

SUMMARY

According to a first aspect, a LiDAR system is provided. The LiDAR system includes a signal generator for generating an output signal having a variable frequency. A modulation circuit receives the output signal from the signal generator and applies the output signal from the signal generator to an optical signal to generate an envelope-modulated optical signal having a frequency-modulated modulation envelope. Optical transmission elements transmit the envelope-modulated optical signal into a region. Optical receiving elements receive reflected optical signals from the region. Receive signal processing circuitry receives the reflected optical signals and uses quadrature detection to process the reflected optical signals.

In some exemplary embodiments, the signal generator comprises a voltage-controlled oscillator (VCO), the frequency of the output signal being variable by a control input applied to the VCO.

In some exemplary embodiments, the frequency of the output signal is controlled to vary according to a ramp between a first frequency and a second frequency. The ramp can be a linear ramp. Alternatively, the ramp can include a plurality of frequency steps between the first and second frequencies. In some exemplary embodiments, the plurality of frequency steps increases in frequency from the first frequency to the second frequency. In some exemplary embodiments, the plurality of frequency steps increases in frequency from the first frequency to the second frequency. In some exemplary embodiments, the plurality of frequency steps varies in frequency in a pseudo-random fashion between the first frequency and the second frequency. In some exemplary embodiments, the first frequency is lower than the second frequency. In some exemplary embodiments, the first frequency is higher than the second frequency.

In some exemplary embodiments, the frequency of the output signal is controlled to vary according to a series of linear ramps between a first frequency and a second frequency. In some exemplary embodiments, the first frequency is lower than the second frequency.

In some exemplary embodiments, the receive signal processing circuitry includes a pair of I/Q mixers, each of the pair of I/Q mixers receiving a pulse modulation envelope signal and providing the pulse modulation envelope signal to respective analog-to-digital converter circuits.

In some exemplary embodiments, the receive signal processing circuitry includes phase shifting circuitry for splitting the output signal from the signal generator into a pair of split signals and applying a phase shift to one of the pair of split signals to generate a first LO signal and a second phase-shifted LO signal, the first LO signal and the second phase shifted LO signal being applied to respective second inputs of respective ones of the pair of I/Q mixers. In some exemplary embodiments, the phase shift is 90 degrees, such that the first LO signal and the second phase-shifted LO signal are in quadrature.

In some exemplary embodiments, the output signal is a substantially sinusoidal signal.

In some exemplary embodiments, the LiDAR system is installed and operates in an automobile.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 18 includes a table which lists exemplary parametric data values for an exemplary illustrative operational configuration of a FMCW LiDAR system, according to exemplary embodiments.

DETAILED DESCRIPTION

Direct detection LiDAR systems are characterized by construction and functional simplicity and, unlike the more complex homodyne or heterodyne LiDAR systems, do not utilize frequency translation or down conversion stages, which facilitate signal detection and processing gain advantages. The signal detection and processing gain advantages of homodyne/heterodyne LiDAR systems are enabled by advanced modulation and coding of the transmitted signal combined with sophisticated correlation processing techniques within the LiDAR receiver. Transmit signal modulation and coding, in conjunction with advanced correlation processing techniques, have been utilized within radar systems, from complex military object imaging systems to commercial automotive autonomous cruise control applications. LiDAR systems, with the exception of very advanced measurement requirements, e.g. NASA measurements of $CO_2$ emissions, have not utilized these techniques. However, according to the present disclosure, development of laser transmit signal envelope modulation and quadrature demodulation of the recovered envelope modulation signal has exhibited similar advantages to those associated and achieved via the radar science. Laser transmitter envelope modulation and quadrature demodulation represent a modest increase in complexity of direct detection LiDAR systems with significant benefits in measurement capability and lower operational power by enabling signal processing gain to direct detection LiDAR.

According to the exemplary embodiments described herein in detail, laser transmitter envelope modulation and receiver quadrature demodulation techniques are applied to direct detection LiDAR systems. Specific transmitter modulation envelope waveforms, e.g., pulse burst and frequency modulated continuous wave (FMCW) are described in detail. Data acquisition techniques and processing gain are also described herein in detail. Specific measurement enhancements and parameters associated with each envelope modulation waveform are also described in detail.

Figure 1:
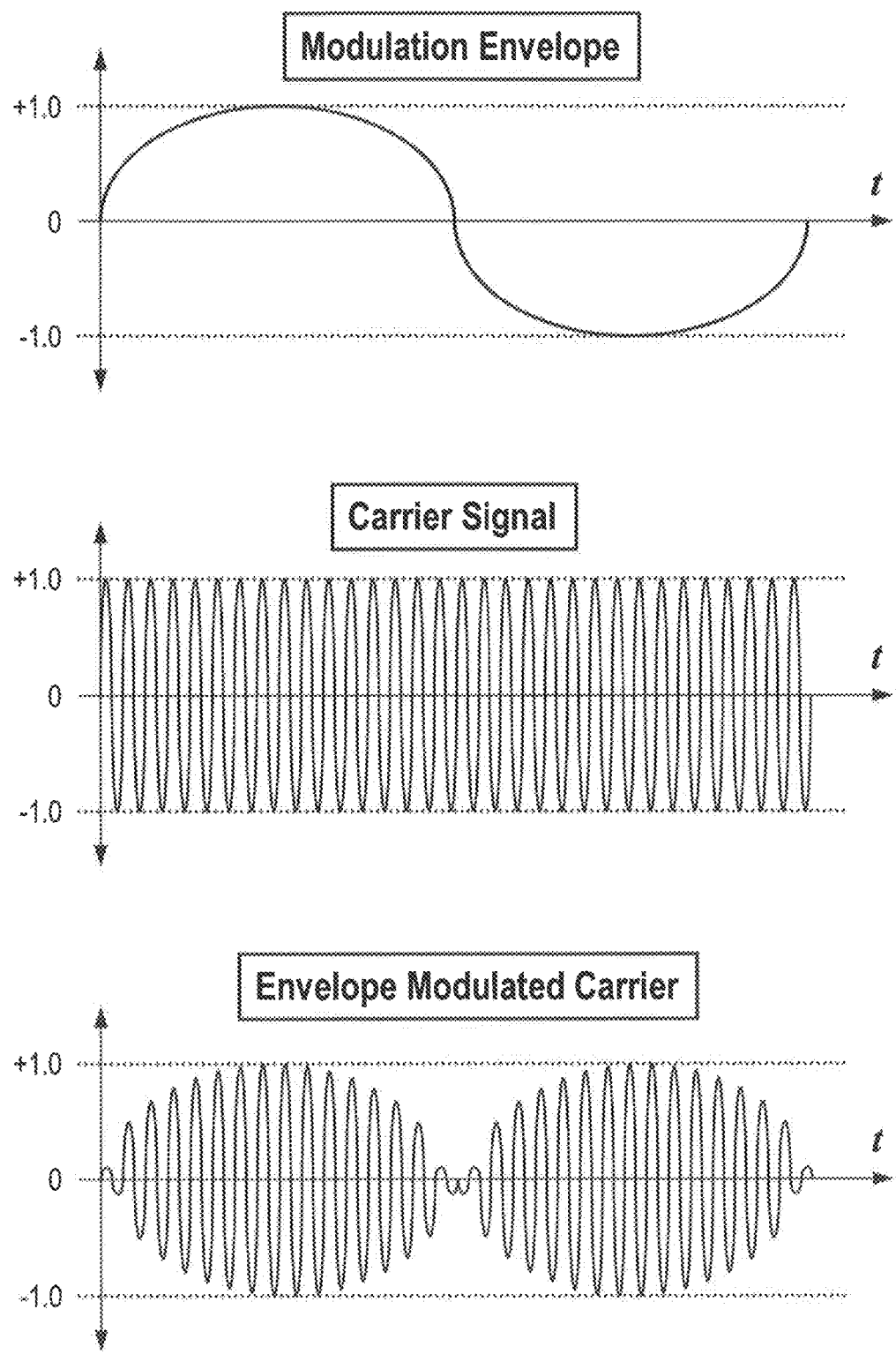
FIG. 1 includes three curves which illustrate transmitter envelope modulation techniques, using a substantially sinusoidal modulation envelope, as applied to direct detection LiDAR, according to exemplary embodiments.

FIG. 1 includes three curves which illustrate a general instance of transmitter envelope modulation techniques, using a substantially sinusoidal modulation envelope, as applied to direct detection LiDAR, according to exemplary embodiments. Referring to FIG. 1, a modulation envelope signal, a sinusoidal carrier signal and an envelope-modulated carrier waveform are illustrated. The mathematical definitions associated with the envelope modulation waveform, carrier and transmit envelope modulated waveform are in accordance with the following equation (1):

$$\text{Mod}(t)=\sin(2\pi f_m t) \rightarrow \text{modulation waveform}$$

$$\text{Car}(t)=\sin(2\pi f_c t) \rightarrow \text{carrier}$$

$$T_x(t)=\text{Mod}(t)\cdot\text{Car}(t) \rightarrow \text{envelop modulated carrier} \quad (1)$$

It is noted that the envelope-modulated carrier implies multiplication of the modulation waveform and the carrier signal. The direct detection LiDAR system performs the multiplication within the laser modulator element as described below in detail. Unlike other systems which use a modulated carrier, the envelope modulation technique results in transmission of both sidebands.

Figure 2:
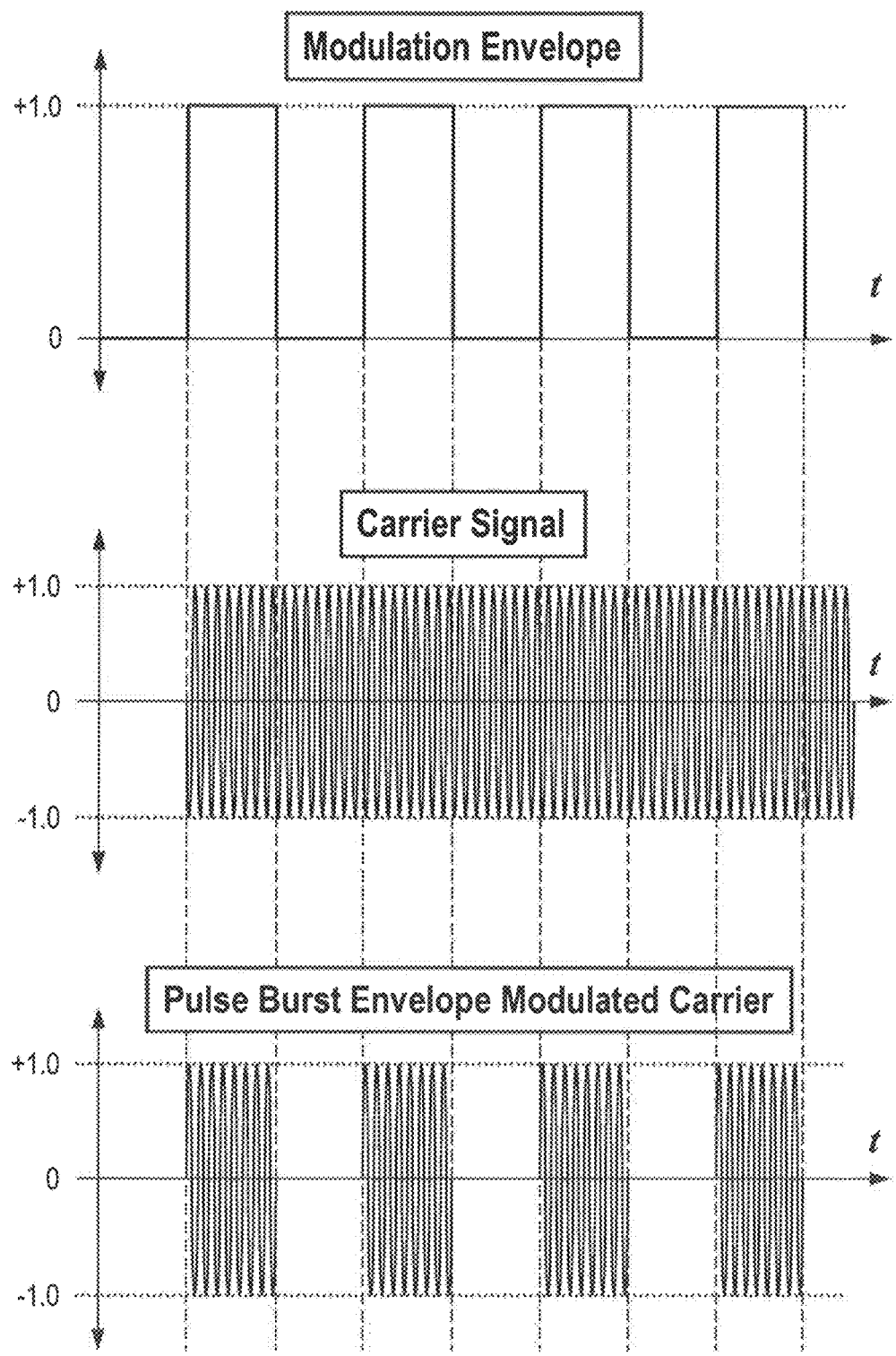
FIG. 2 includes three curves which illustrate transmitter envelope modulation techniques, using a pulse burst modulation envelope, as applied to direct detection LiDAR, according to other exemplary embodiments.

FIG. 2 includes three curves which illustrate transmitter envelope modulation techniques, using a pulse burst modulation envelope, as applied to direct detection LiDAR, according to other exemplary embodiments. Referring to FIG. 2, a modulation envelope signal, a sinusoidal carrier signal and an envelope-modulated carrier waveform are illustrated. In the pulse-burst envelope modulation illustrated in FIG. 2, a repetitive pulse waveform modulates the carrier. Laser modulators are capable of pulse modulation at very high repetition frequencies, e.g., several hundred megahertz, which facilitates coherent detection of the recovered modulation waveform with attendant signal processing benefits as will be described in detail herein.

It should be noted that, in accordance with exemplary embodiments, the position in time of the modulating pulses may be a variable, which allows for pulse position modulation (PPM) coding.

Figure 3:
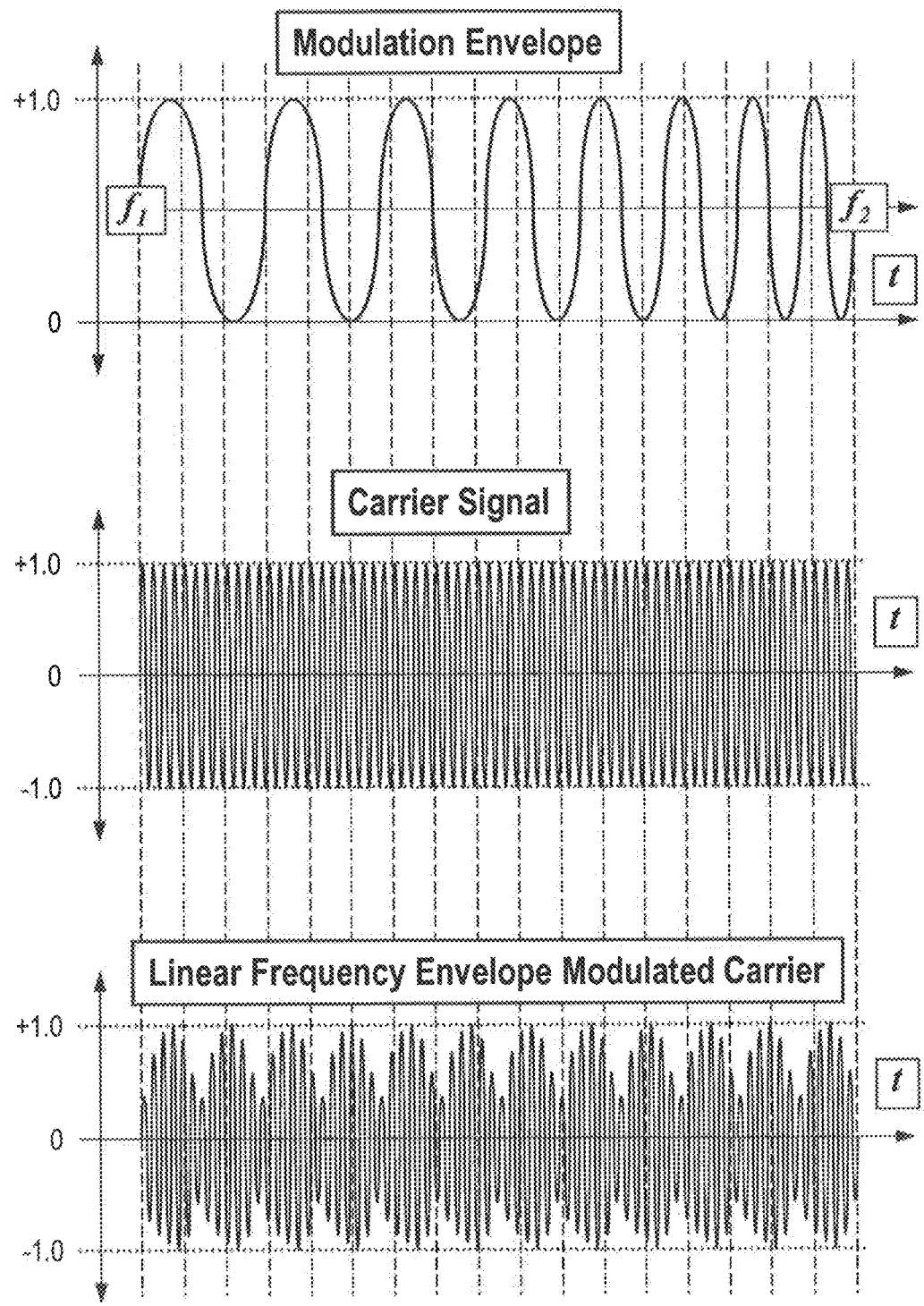
FIG. 3 includes three curves which illustrate transmitter envelope modulation techniques, using linear frequency envelope modulation, as applied to direct detection LiDAR, according to other exemplary embodiments.

FIG. 3 includes three curves which illustrate transmitter envelope modulation techniques, using linear frequency envelope modulation, as applied to direct detection LiDAR, according to other exemplary embodiments. Referring to FIG. 3, a modulation envelope signal having a linear variation in frequency, a sinusoidal carrier signal and an envelope-modulated carrier waveform are illustrated. FIG. 3 illustrates linear frequency envelope modulation, where, in this particular exemplary embodiment, the modulation waveform frequency is linearly changed from $f_1$ to $f_2$ ($\Delta F$) over a specific time interval ($\Delta T$). The linear frequency modulation envelope is advantageous for the implementation of FMCW LiDAR due to the ability to provide high-range resolution in accordance with the frequency deviation ($\Delta F$), lower detection bandwidth and the unique spectral resolution properties of the Fast Fourier Transform (FFT) computation technique.

One principle of transmitter envelope modulation is that upon transmission, the modulation envelope is subject to phase delay in accordance with the envelope frequency. The total transmission phase shift in the two-way range from LiDAR system to object is described by the following equation (2):

$$\Delta \phi = 2\pi \frac{2R}{\lambda_{mod}}; \quad (2)$$

$\Delta \phi$: transmission phase shift $R$: range to object $\lambda_{mod}$: envelop modulation wavelength In exemplary embodiments, upon envelope recovery in a photo-diode, or photodetector or light detector, as described below in detail, the amplitude and transmission phase of the modulation envelope are demodulated in the quadrature demodulator.

Figure 4:
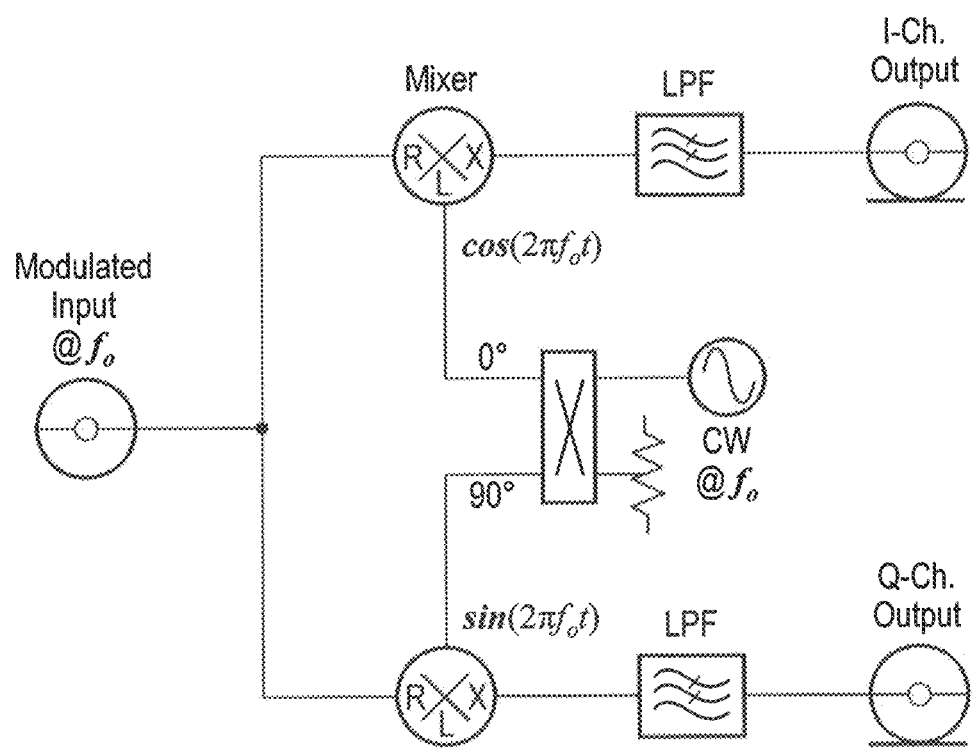
FIG. 4 includes a schematic functional block diagram of a quadrature demodulation system and technique, according to some exemplary embodiments.

FIG. 4 includes a schematic functional block diagram of a quadrature demodulation system and technique, according to some exemplary embodiments. Quadrature demodulation is an efficient detection technique which utilizes the advantages of coherent signals to provide the orthogonal, or vector signal components of a modulated signal. Quadrature demodulation is universal in the sense that it has the ability to recover amplitude modulation (AM), frequency modulation (FM) and phase modulation (PM) components of a modulated signal. Referring to FIG. 4, a modulated input signal to be demodulated, having a frequency, is received and applied to in-phase and quadrature-phase mixers. A quadrature demodulator according to the exemplary embodiments includes a coherent, continuous wave (CW) local oscillator (LO) signal at the modulated carrier input frequency $f_0$, a 0°/90° power divider, the in-phase and quadrature-phase mixers, and low-pass filters to eliminate the LO signal and other spurious signals from the demodulated output, which is provided at an I-channel output and a Q-channel output as shown. In order for the LO to be coherent with the received envelope modulated signal, according to exemplary embodiments, a single-frequency source is utilized for both envelope modulation and quadrature demodulator LO.

Figure 5:
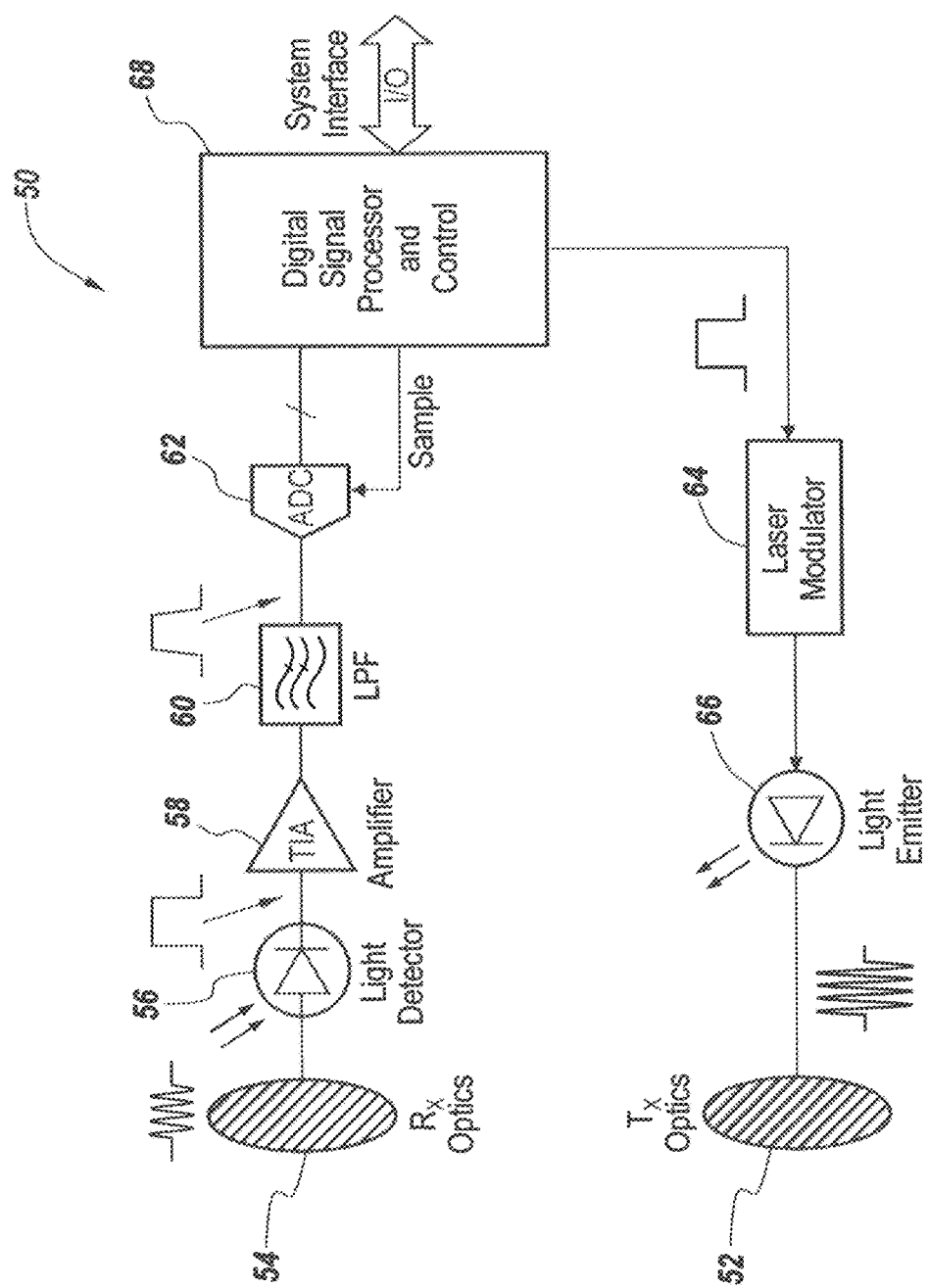
FIG. 5 includes a schematic functional block diagram of a conventional direct detection LiDAR system.

In contrast with the envelop-modulated/quadrature-demodulation direct-detection LiDAR approach of the exemplary embodiments, FIG. 5 includes a schematic functional block diagram of a conventional direct detection LiDAR system 50. Referring to FIG. 5, a typical operational configuration involves the transmission of a high-power laser transmit pulse of short duration, typically 2.0 to 20 nanoseconds, at transmit optics 52, via light emitter 66, modulated under the control of a digital signal processor and control (DSPC) 68 by laser modulator 64. A portion of the transmitted pulse is reflected from an object within the transmitter beam width and subsequently captured by the receive optics 54 and light detector 56 following the two-way time of flight to the object. The received signal is then amplified by the transimpedance amplifier (TIA) 58 and filtered by a low-pass filter (LPF) 60. The analog-to-digital converter (ADC) 62 samples range bins commensurate with the pulse width. Under control of DSPC 68, if a signal is determined to exceed a specific threshold level within a specific range bin, a target is declared. Other processing strategies may be employed to improve the signal-to-noise ratio, e.g., range bin sampling following multiple transmitter pulses and integration of the received signal energy from each transmitted pulse, also known as non-coherent detection; however, the basic operation is limited to high-power pulse transmission and receive signal detection and amplification.

In addition to the above described direct detection LiDAR system 50, a time-of-flight (TOF) system transmits multiple pulses in the form of a square-wave and utilizes a phase detector on receive to measure the two-way time of flight. The time-of-flight system must limit the square-wave modulation frequency in order to avoid phase ambiguity.

Figure 6A:
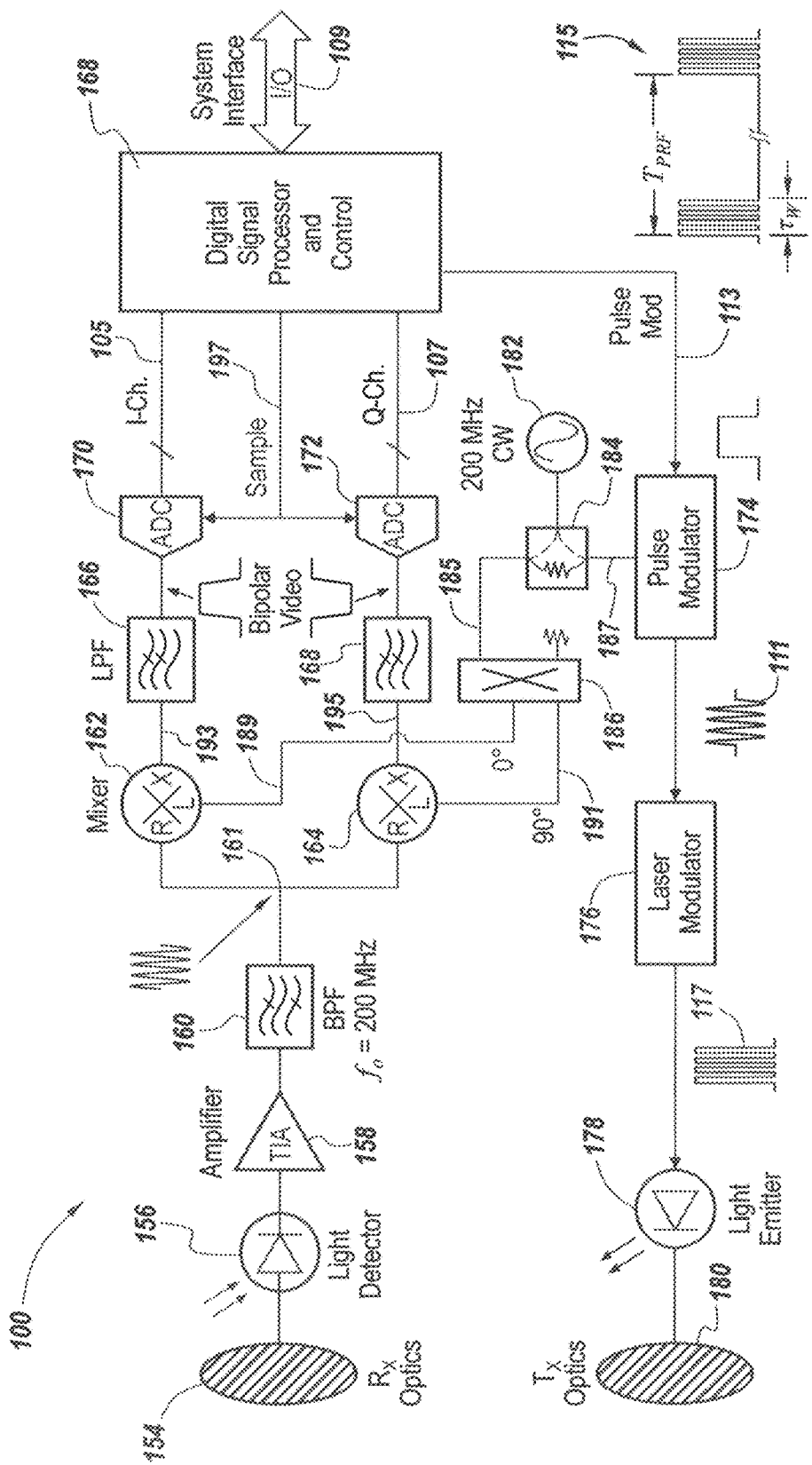
FIG. 6A includes a schematic functional block diagram which illustrates a LiDAR system using pulse-burst transmit envelope modulation illustrated in FIG. 2 and quadrature demodulation, according to some exemplary embodiments.
Figure 6B:
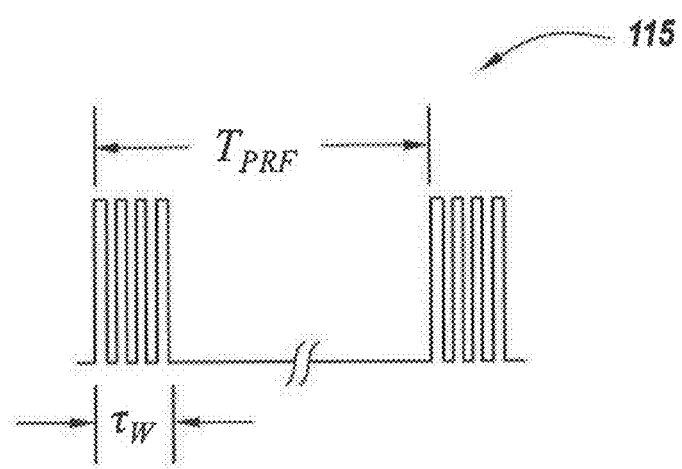
FIG. 6B is a schematic diagram illustrating detail of the pulse burst modulation signal used in the system of FIG. 6A, according to some exemplary embodiments.

FIG. 6A includes a schematic functional block diagram which illustrates a LiDAR system 100 using pulse-burst transmit envelope modulation illustrated in FIG. 2 and quadrature demodulation, according to some exemplary embodiments. In contrast with the conventional pulse modulation of the basic direct detection LiDAR system 50 illustrated in FIG. 5, in system 100 of FIG. 6A, a repetitive pulse burst is used instead of the single repetitive pulse. FIG. 6B is a schematic diagram illustrating detail of the pulse burst modulation signal 115 used in the system 100 of FIG. 6A, according to some exemplary embodiments. Also, in system 100 of FIG. 6A, the burst frequency, which in some particular exemplary embodiments is 200 MHz, produces the transmission of two sidebands, each offset from the operational laser wavelength (frequency) by the modulation frequency. Also, in system 100 of FIG. 6, the modulation frequency is coherent with the recovered envelope on receive, thereby providing an efficient means of modulated signal detection. Also, a band pass filter centered at the modulation burst frequency attenuates the broadband noise of the TIA, and also the 1/f noise associated with the photo-detector and TIA. Also, a quadrature demodulator is employed to recover pulse burst envelope and attendant two-way transmission phase shift of the modulation envelope.

Referring to FIGS. 6A and 6B, LiDAR system 100 according to exemplary embodiments includes receive optics 154 at which optical energy, including optical returns from one or more target objects, are received. The optical energy is received from receive optics 154 at a light detector 156, which converts the received optical energy to one or more electrical signals. The electrical signals are amplified by TIA 158 and filtered by BPF 160, having a center frequency at the burst modulation frequency $f_0$. In some particular exemplary embodiments, the center frequency of BPF 160, $f_0$=200 MHz, although other frequencies may be utilized. The resulting amplified and filtered signal is applied at node 161 to first inputs of I/Q mixers 162, 164.

The optical signal used to illuminate the one or more target objects is generated by a signal generator 182. The output signal of signal generator 182, which in exemplary embodiments is a continuous substantially sinusoidal signal, is applied to a power splitter 184, which splits the signal and provides the split signal at two outputs. The first output 185 is routed to splitting and phase shifting circuitry or 90-degree power splitter 186, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degree power splitter 186 generates a first "in-phase" local oscillator (LO) signal 189 and a second "quadrature-phase" or "quadrature" LO signal 191, which is shifted in phase by 90 degrees with respect to in-phase LO signal 189. The in-phase and quadrature-phase LO signals 189, 191 are applied to second inputs of I/Q mixers 162, 164, respectively. I/Q mixers 162, 164 mix the amplified and filtered input signal at node 161 with the in-phase and quadrature-phase LO signals 189, 191, respectively, to generate output signals 193, 195, respectively, which are low-pass filtered by low-pass filter (LPF) 166 and LPF 168, respectively. The resulting filtered analog signals are converted to digital signals by analog-to-digital converters (ADC) 170, 172, respectively, and sampled under the control of sample control signal 197, which is generated by digital signal processor and control (DSPC) 168. The resulting sampled digital I/Q (quadrature) signals, i.e., I-channel and Q-channel signals, 105, 107 are processed by DSPC 168 to determine range and/or velocity of the one or more target objects. Results of this detection processing performed by DSPC 168 can be forwarded as desired, such as, for example, to a user interface, via a system interface 109.

Continuing to refer to FIGS. 6A and 6B, the second output 187 of power splitter 184 is routed to a pulse modulator 174, which converts the continuous substantially sinusoidal signal 187 from power splitter 184 to a pulsed substantially sinusoidal signal 111. The timing of pulses in the pulsed sinusoidal signal 111 is controlled by pulse burst modulation signal 115 on output signal line 113 from DSPC 168. That is, pulse burst modulation signal 115 is used by pulse modulator 174 to modulate continuous substantially sinusoidal signal 187 to generate pulsed substantially sinusoidal signal 111. The resulting pulsed amplitude-modulated signal 111 from pulse modulator 174 is applied as a modulation signal to a laser modulator 176, which generates a control/modulation signal, which is applied to light emitter 178 to generate a pulsed amplitude-modulated optical signal, which is transmitted to transmit optics 180, by which the pulsed modulated optical signal is transmitted to the one or more target objects.

Thus, according to exemplary embodiments, the quadrature detection precedes analog-to-digital conversion. The quadrature detector recovers the pulse modulation envelope associated with the low-frequency pulse modulation. The data samples are subsequently processed via spectral resolution or other means of each range bin data set. The spectral resolution approach used reduces the detection bandwidth and effectively integrates the energy of the range bin sample set.

According to the exemplary embodiments, Doppler frequency detection of moving objects within the field of view of LiDAR system 100 is enabled by coherent detection of the change in phase which results from the change in range due to relative velocity between LiDAR system 100 and the target object. Doppler detection is significant because the detection bandwidth reduction associated with Doppler processing increases the signal-to-noise ratio in direct proportion to the bandwidth ratio.

According to some exemplary embodiments, in addition to Doppler processing, multiple frame range bin sampling may also be used to execute a coherent pulse integration approach which also increases the signal-to-noise ratio in direct proportion to the number of pulses integrated.

Figure 7:
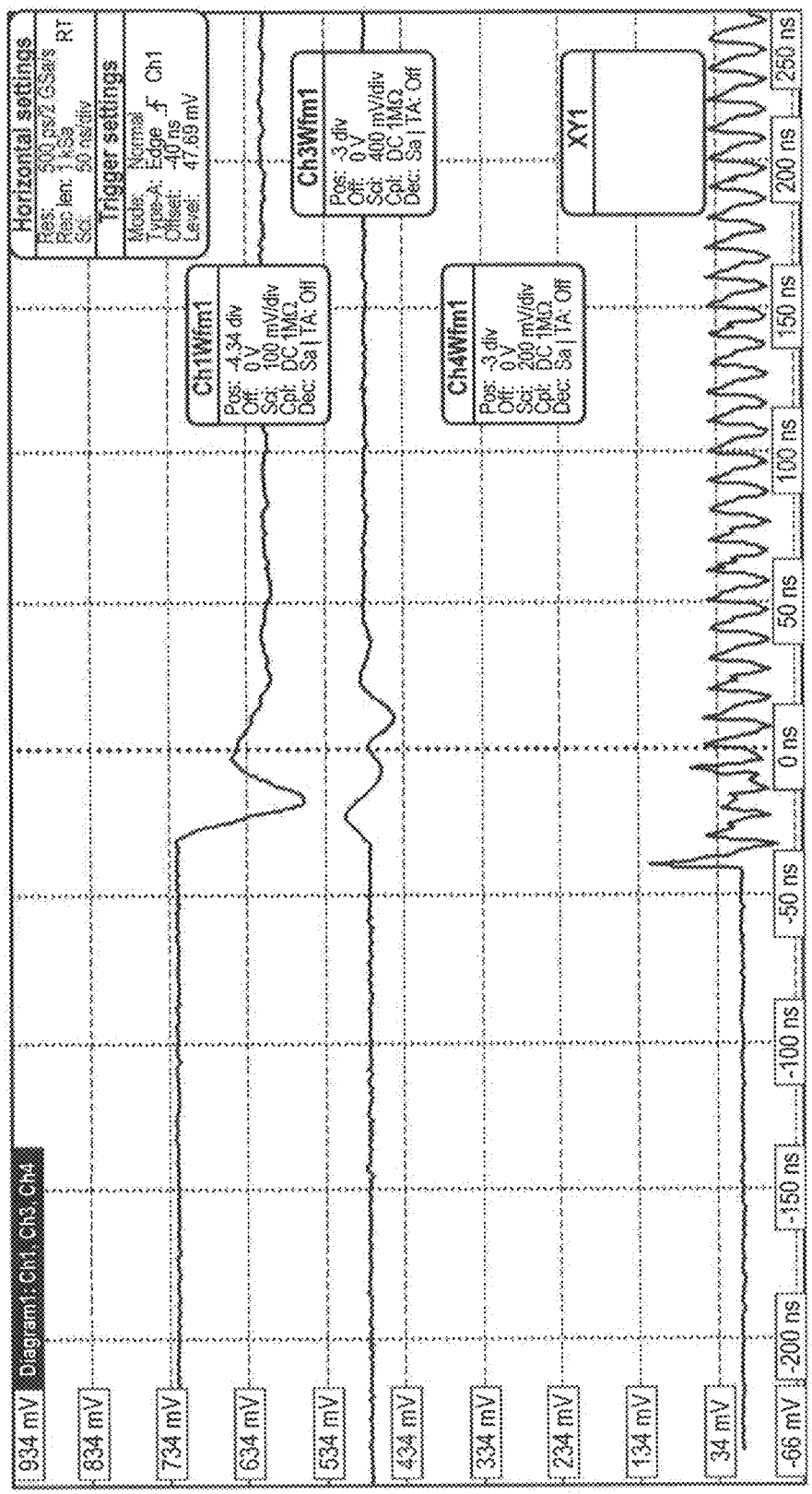
FIG. 7 is a graph which includes three curves illustrating experimental data associated with the pulse burst envelope modulation LiDAR system described herein in detail, according to exemplary embodiments.

FIG. 7 is a graph which includes three curves illustrating experimental data associated with the pulse burst envelope modulation LiDAR system 100 described herein in detail, according to exemplary embodiments. Referring to FIG. 7, the upper and middle curves are the I-channel and Q-channel video outputs, indicating detection of the modulation envelope following coherent detection. If the detection object exhibited motion, the I-channel and Q-channel signal amplitude would vary in accordance with the transmission phase change associated with the object motion. This phenomenon leads to the ability to detect Doppler frequency using the pulse burst envelope modulation and quadrature demodulation. The trace at the lower extreme of the graph of FIG. 7 is the photo diode signal at the output of TIA 158, which illustrates the 200 MHz envelope modulation signal prior to coherent detection. The time scale is 50 nanoseconds per division.

Detailed description of data acquisition and signal processing techniques that may be utilized in conjunction with pulse burst envelope modulation LiDAR system 100 with quadrature demodulation is now provided. The first step in the pulse burst envelope modulation LiDAR system signal processing is acquisition of a data set which represents the signal level of each range bin at the output of each channel of the quadrature demodulator from successive transmission pulses.

Figure 8:
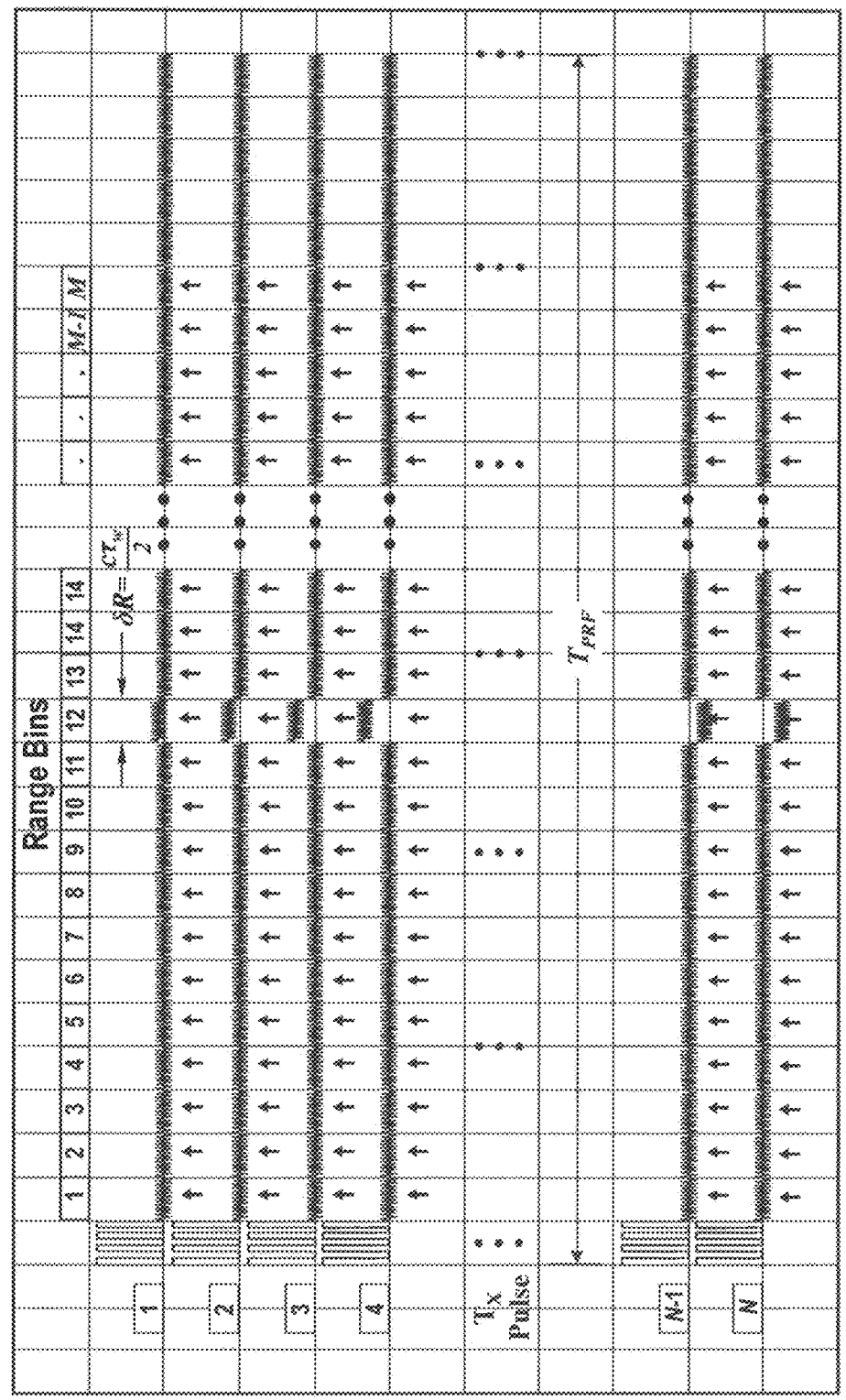
FIG. 8 includes a schematic diagram illustrating pulse burst data acquisition for the I-channel or the Q-channel, according to some exemplary embodiments.

FIG. 8 includes a schematic diagram illustrating pulse burst data acquisition for the I-channel or the Q-channel, according to some exemplary embodiments. FIG. 8 represents the filling of a data matrix (set) following successive transmission pulses. According to exemplary embodiments, a frame is defined as a single transmission pulse burst, followed by a receive interval during which the ADC 170, 172 acquires a sample from each channel of the quadrature demodulator output at each range bin. A range bin is defined in accordance with the pulse burst width which sets the range measurement resolution. The range resolution may be written as equation (3):

$$\delta R = \frac{c\tau_w}{2}; \quad (3)$$

$\delta R$: range resolution $\tau_w$: pulse burst width $c$: speed of light

Referring to FIG. 8, which may represent an I-channel or Q-channel signal, the arrows designate sample points of the ADCs 170, 172. A variable-amplitude return signal is noted in range bin 12. The variable amplitude is the result of the change in phase of a moving object within range bin 12. A stationary object produces a fixed amplitude signal level.

Upon completion of M range bin samples in each of N frames, an M×N data matrix is filled for each channel of the quadrature demodulator. It should be noted that the variable-amplitude range bin pulses result from moving objects that are coherently detected by the quadrature demodulator and enable Doppler frequency measurement via spectral resolution of the range bin samples.

There are two processing approaches available to enhance signal detection via increase to the signal-to-noise ratio: coherent pulse integration and spectral resolution of each column of the data matrix. Each column of the data matrix represents range bin samples taken at discrete time points following transmission of the pulse burst. The approach related to coherent pulse integration is captured within the following equation (4):

$$A_{PI} = \sum_{n=1}^{N} (I_n^2 + Q_n^2); \quad (4)$$

$I_n$: $n^{th}$ I-channel value of a range bin column $Q_n$: $n^{th}$ Q-channel value of a range bin column In the presence of zero-mean, Gaussian noise, ideal coherent pulse integration improves the signal-to-noise ratio by N, the number of pulses integrated.

Spectral resolution is executed in accordance with the discrete Fourier Transform and the following equation (5):

$$DFT_k = \frac{1}{N}\sum_{n=1}^{N} I_{ch\_n}\cos\left(2\pi\frac{kn}{N}\right) + j\frac{1}{N}\sum_{n=1}^{N} Q_{ch\_n}\sin\left(2\pi\frac{kn}{n}\right); \quad (5)$$

Figure 9:
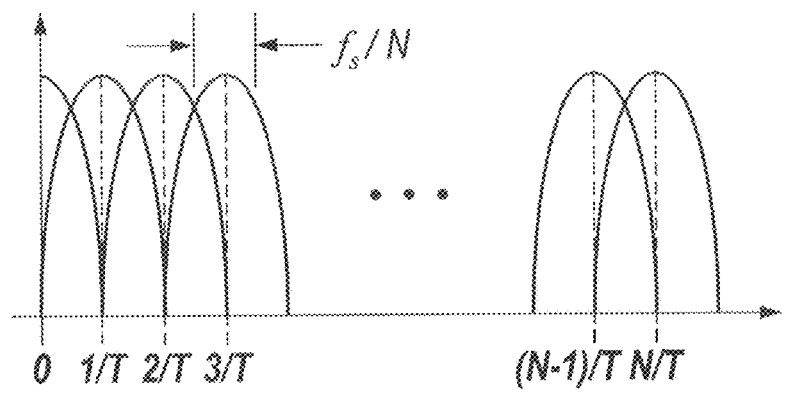
FIG. 9, which is a schematic diagram illustrating Fast Fourier Transform (FFT) implementation of a filter bank of N filters.

$DFT_k$: $k^{th}$ element of the discrete Fourier Transform $I_n$ and $Q_n$: as previously defined The FFT is a computationally efficient technique for the calculation of the discrete Fourier Transform, which implements a set of identical filters, or filter bank, distributed uniformly over the frequency domain at intervals of 1/NT, where T is the time interval over which N samples of a waveform have been acquired. This is illustrated in FIG. 9, which is a schematic diagram illustrating FFT implementation of a filter bank of N filters. The FFT is particularly well suited to IF spectral resolution in FMCW radars because the narrow information bandwidth requires a filter bank which may be implemented numerically with a modest capability digital signal processor.

Figure 10:
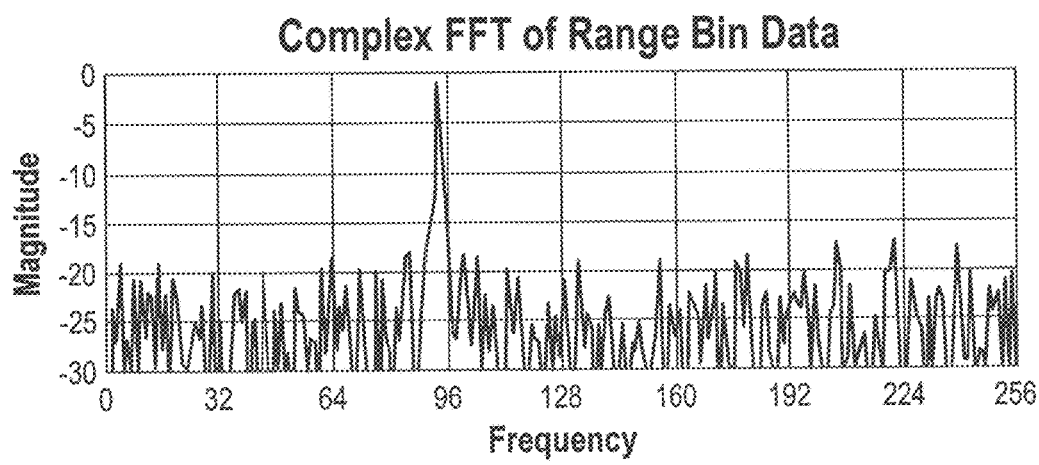
FIG. 10 includes a graph of complex FFT processing gain simulation results, according to exemplary embodiments.

It is useful to quantify the signal processing gain for the pulse burst LiDAR envelope modulation waveform. Simulation results are documented within the graphic of FIG. 10, which is a graph of complex FFT processing gain simulation results, according to exemplary embodiments. Referring to FIG. 10, the results illustrate a processing gain of approximately 23.5 dB as estimated from the graph. The pre-processing signal-to-noise ratio was set to 0 dB. The theoretical processing gain as calculated from PG=10·log (N=512)=27.1 dB. Note is made of the signal in bin k=93 at −1.5 dB; noise level at −25.0.

Figure 11:
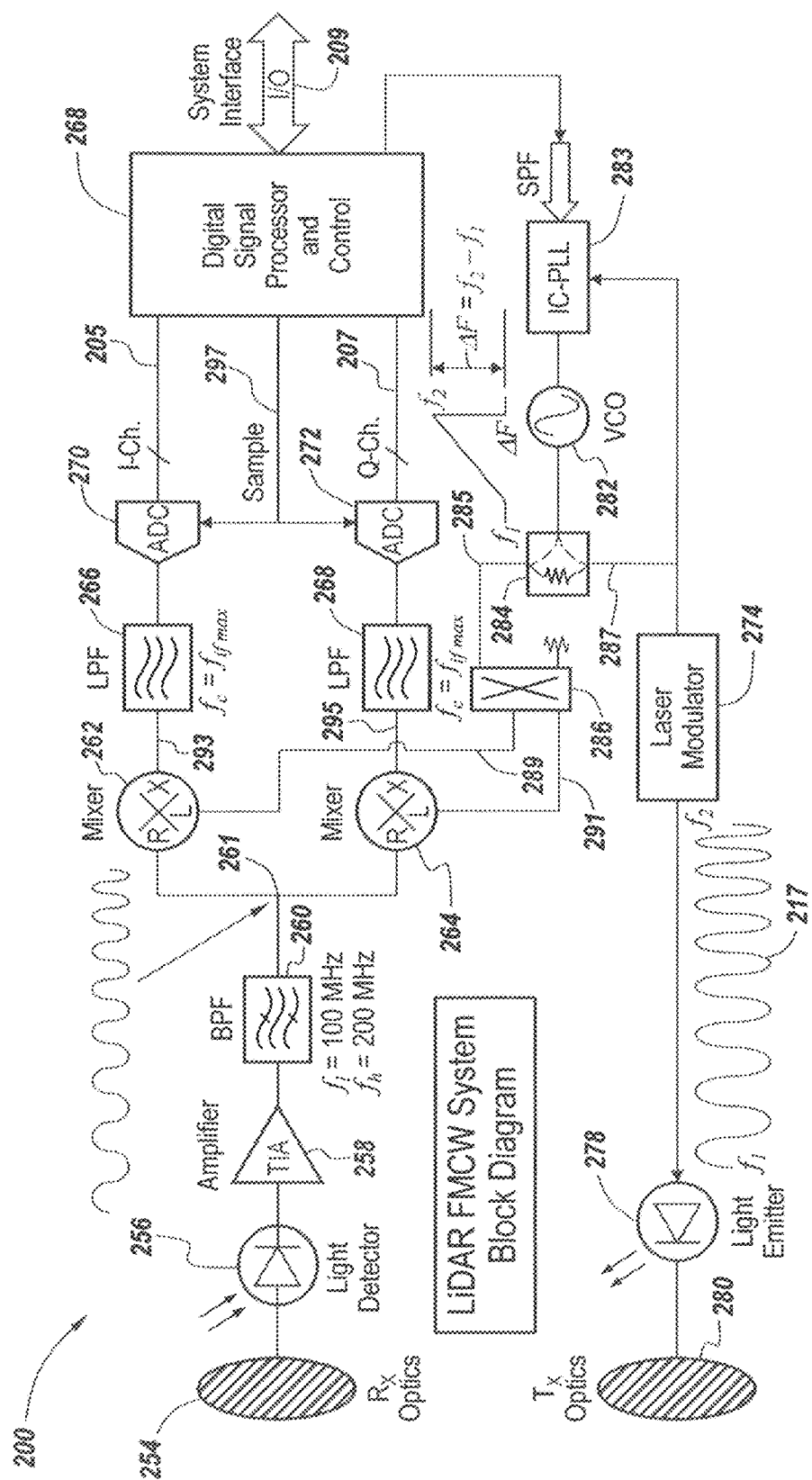
FIG. 11 includes a schematic functional block diagram which illustrates a LiDAR system using FMCW transmit envelope modulation illustrated in FIG. 3 and quadrature demodulation, according to some exemplary embodiments.

According to exemplary embodiments, the direct detection LiDAR described in detail herein can also use FMCW modulation, instead of pulse burst modulation, along with quadrature demodulation. FIG. 11 includes a schematic functional block diagram which illustrates a LiDAR system 200 using FMCW transmit envelope modulation illustrated in FIG. 3 and quadrature demodulation, according to some exemplary embodiments. FIG. 11 illustrates the system block diagram of the transmitter envelope modulation LiDAR system 200 using a linear deviation in modulation frequency from a first frequency $f_1$ to a second frequency $f_2$, such that the linear deviation in modulation frequency, $\Delta F$, is given by $\Delta F = f_2 - f_1$, over a time interval of $\Delta T$, as illustrated graphically in the block diagram of FIG. 11. It should be noted that all of the foregoing detailed description with respect to pulse burst modulation in LiDAR system 100 is applicable to FMCW modulation in LiDAR system 200, unless the context dictates otherwise.

Referring to FIG. 11, LiDAR system 200 according to exemplary embodiments includes receive optics 254 at which optical energy, including optical returns from one or more target objects, are received. The optical energy is received from receive optics 254 at a light detector 256, which converts the received optical energy to one or more electrical signals. The electrical signals are amplified by TIA 258 and filtered by BPF 260, having a low cutoff frequency $f_l$ and a high cutoff frequency $f_h$, which define the nominal endpoints of the FM frequencies in each linear frequency sweep, used to modulate the light carrier signal, according to the exemplary embodiments. In some particular exemplary embodiments, $f_l$=100 MHz and $f_2$=200 MHz, although other frequencies may be utilized. The resulting amplified and filtered signal is applied at node 261 to first inputs of I/Q mixers 262, 264.

The modulating FM signal is generated by a voltage-controlled oscillator (VCO) 282 under the control of a control signal from phase-locked loop (PLL) control circuit 283, which is in turn controlled by DSPC 268. As illustrated in FIG. 11, the frequency of the VCO 282 output is controlled to take on a linear ramp configuration from a first frequency $f_l$ to a second frequency $f_2$. The output signal of VCO 282 is applied to a power splitter 284, which splits the signal and provides the split signal at two outputs. The first output 285 is routed to splitting and phase shifting circuitry or 90-degree power splitter 286, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degree power splitter 286 generates a first "in-phase" local oscillator (LO) signal 289 and a second "quadrature-phase" or "quadrature" LO signal 291, which is shifted in phase by 90 degrees with respect to in-phase LO signal 289. The in-phase and quadrature-phase LO signals 289, 291 are applied to second inputs of I/Q mixers 262, 264, respectively. I/Q mixers 262, 264 mix the amplified and filtered input signal at node 261 with the in-phase and quadrature-phase LO signals 289, 291, respectively, to generate output signals 293, 295, respectively, which are low-pass filtered by low-pass filter (LPF) 266 and LPF 268, respectively, having a cutoff frequency at the maximum IF frequency of mixers 262, 264, $f_{if\_max}$. The resulting filtered analog signals are converted to digital signals by analog-to-digital converters (ADC) 270, 272, respectively, and sampled under the control of sample control signal 297, which is generated by DSPC 268. The resulting sampled digital I/Q (quadrature) signals, i.e., I-channel and Q-channel signals, 205, 207 are processed by DSPC 268 to determine range and/or velocity of the one or more target objects. Results of this detection processing performed by DSPC 268 can be forwarded as desired, such as, for example, to a user interface, via a system interface 209.

Continuing to refer to FIG. 11, the second output 287 of power splitter 284 is routed to a laser modulator 274, which modulates the optical output signal at light emitter 278 with the linear FM signal 217, which has a frequency which varies linearly from $f_1$ to $f_2$. The resulting frequency-modulated signal is applied to light emitter 278 to generate an envelope-modulated optical signal 219 (see FIG. 12C) in which the envelope is a frequency-modulated signal, which is transmitted to transmit optics 280, by which the envelope-frequency-modulated optical signal 219 is transmitted to the one or more target objects.

Figure 12A:
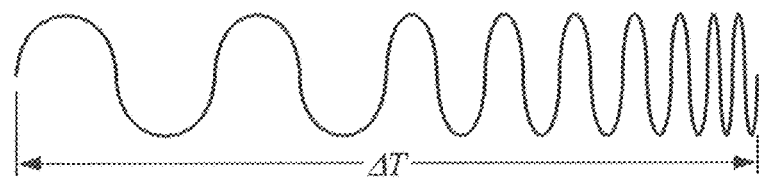
FIG. 12A is a schematic timing diagram of a frequency modulation signal, having a frequency-modulated substantially sinusoidal configuration, according to exemplary embodiments.
Figure 12B:
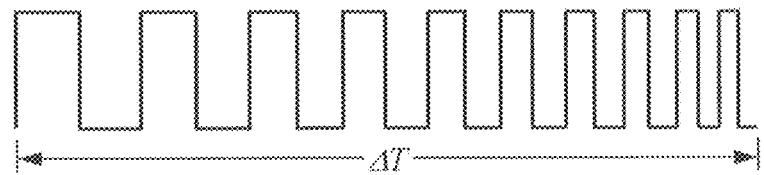
FIG. 12B is a schematic timing diagram of a frequency modulation signal, having a frequency-modulated substantially square wave configuration, according to exemplary embodiments.
Figure 12C:
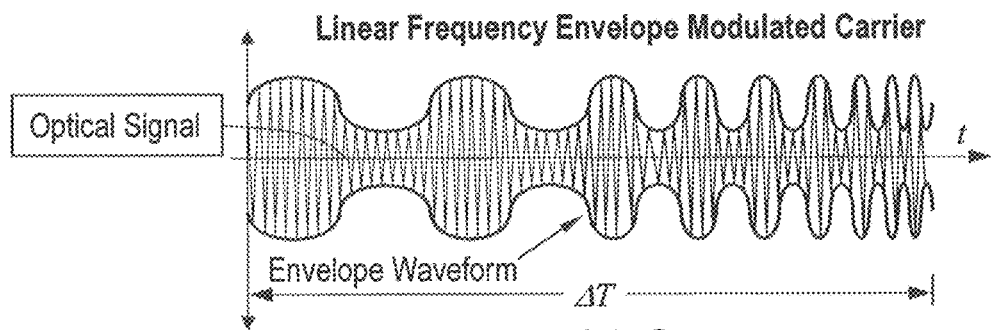
FIG. 12C is a schematic timing diagram of an envelope-modulated optical signal, generated using the substantially sinusoidal frequency modulation signal of FIG. 12A, according to exemplary embodiments.
Figure 12D:
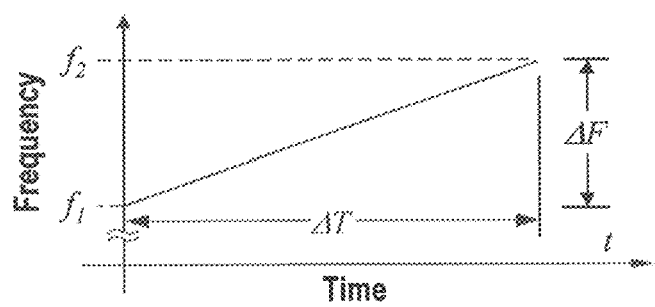
FIG. 12D is a schematic timing diagram of the frequency deviation versus time for the frequency modulation signals of FIGS. 12A and 12B, according to exemplary embodiments.

FIG. 12A is a schematic timing diagram of frequency modulation signal 217, having a frequency-modulated substantially sinusoidal configuration, according to exemplary embodiments. FIG. 12B is a schematic timing diagram of frequency modulation signal 217A, having a frequency-modulated substantially square wave configuration, according to exemplary embodiments. FIG. 12C is a schematic timing diagram of envelope-modulated optical signal 219, generated using substantially sinusoidal frequency modulation signal 217 of FIG. 12A, according to exemplary embodiments. FIG. 12D is a schematic timing diagram of the frequency deviation versus time for the frequency modulation signals 217 and 217A of FIGS. 12A and 12B, according to exemplary embodiments. Referring to FIGS. 11 and 12A-12D, the LiDAR antenna or transmit optics 280 transmit envelope-modulated optical signal 219 toward an object at range, R. The change in frequency of the envelope modulation waveform is linear over a finite duration of time, ΔT, and frequency deviation, ΔF. It should be noted that, according to the exemplary embodiments, other envelope frequency modulation waveforms may be utilized, e.g., FSK (frequency shift keying), stepped-FSK, PRFM (pseudo-random frequency modulation), etc.

Upon incidence with an object within the beam width of transmit antenna 280, the transmitted signal is scattered or reflected, in accordance with the geometric and other physical properties of the object. A fraction of the scattered signal is received by the LiDAR light detector where the FM-modulated envelope is recovered and subsequently amplified by the transimpedance amplifier 258.

The recovered/amplified FM modulation waveform envelop is further processed with band pass filter 260 centered at the arithmetic mean of the frequency limits $(f_2-f_1)/2$ and bandwidth commensurate with the envelope modulation frequency limits $(f_2-f_1)$. Band pass filter 260 rejects extraneous signals as well as broad band noise from TIA 258 and 1/f noise of detector 256 and TIA 258. The received signal propagates to the input of the quadrature demodulator where the difference frequency is detected and applied to ADCs 270, 272. The frequency difference results from the time delay difference between the two-way range time delay and the coherent local oscillator at the input to the quadrature demodulator.

Figure 13:
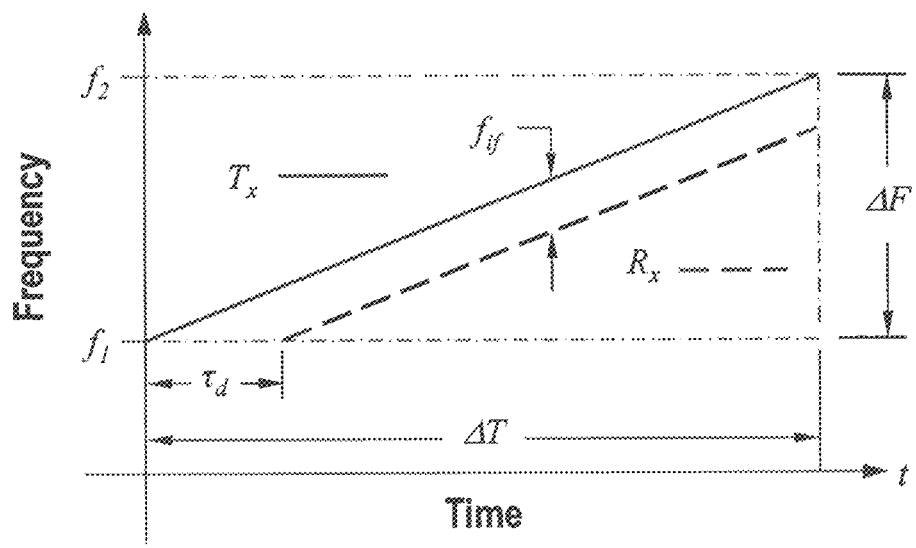
FIG. 13 includes a schematic illustration of a graph of frequency versus time to illustrate the intermediate frequency (IF) output frequency from a target object.

According to exemplary embodiments, coherent detection of the linear FM modulation envelope provides range information in accordance with the graph of FIG. 13, which includes a schematic illustration of a graph of frequency versus time to illustrate the intermediate frequency (IF) output frequency from a target object. FIG. 13 illustrates the relationship between the transmit signal, the received (delayed) signal and the resulting difference frequency. Referring to FIG. 13, the signal frequency at the output of the quadrature demodulator may be written according to equation (6):

$$f_{if} = \tau_d \cdot \frac{\Delta F}{\Delta T} = \frac{2R}{c} \cdot \frac{\Delta F}{\Delta T}; \quad (6)$$

$\tau_d$: two-way time delay

R: object range,

ΔF: ramp frequency deviation

ΔT: ramp deviation interval c: speed of light

The ADCs 270, 272 acquire samples of the quadrature demodulator output during the linear frequency ramp interval, ΔT; the sample sequence is then subjected to spectral analysis. The spectral analysis approach is generally executed in accordance with the Fast Fourier Transform (FFT), which implements a filter bank of discrete range bins. Each range bin is examined to determine if a signal is present at a specific threshold level.

Figure 14:
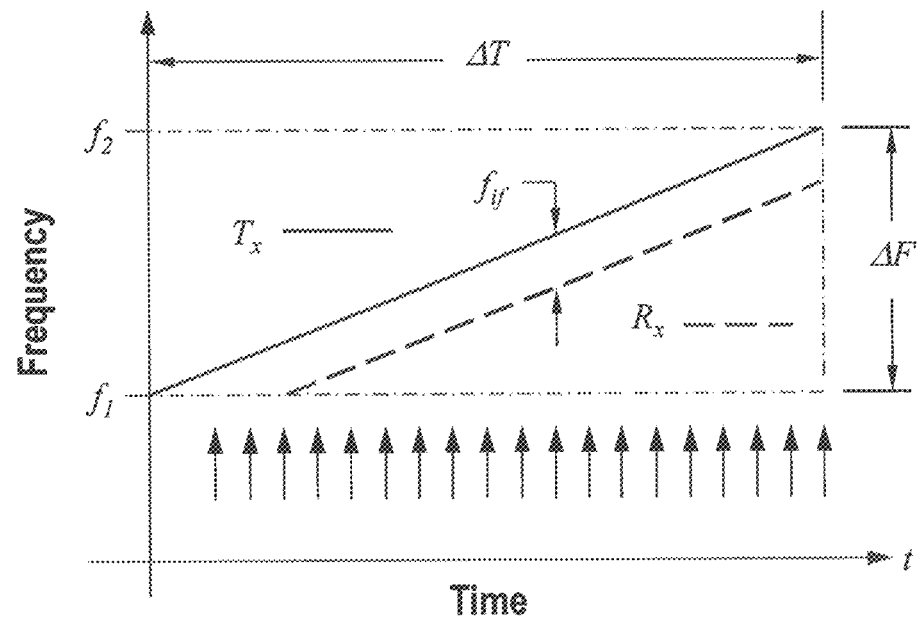
FIG. 14 includes a schematic timing diagram of ADC sampling of I-channel and Q-channel IF signals, according to exemplary embodiments.

FIG. 14 includes a schematic timing diagram of ADC sampling of I-channel and Q-channel IF signals, according to exemplary embodiments. Referring to FIG. 14, during the transmit interval, the I-channel IF signal and Q-channel IF signal are continually sampled by ADCs 270, 272, and the samples are stored within the DSPC 268 memory. In FIG. 14, the ADC samples are represented by the vertical arrows. The sampling rate, $f_s$, is the number of samples, N, divided by the frequency ramp time, ΔT, and must be greater than highest IF frequency (for I/Q sampling) in order to comply with the Nyquist sampling rule. Therefore:

$$f_s \geq f_{IF\_max} = \frac{2R_{max}}{c} \cdot \frac{\Delta F}{\Delta T}; \quad (7)$$

Data acquisition and signal processing techniques that may be utilized in conjunction with the FMCW envelope modulation LiDAR system and quadrature demodulation, according to some exemplary embodiments, is now described in detail. In addition to the one-dimensional FFT processing described above, a two-dimensional FFT may be executed which further enhances the detection process and provides Doppler frequency detection. Two-dimensional FFT is also described in detail herein, where a processing gain of 24.1 dB is calculated for the 256 point range FFT and 21.1 dB for the 128 point Doppler FFT.

Figure 15:
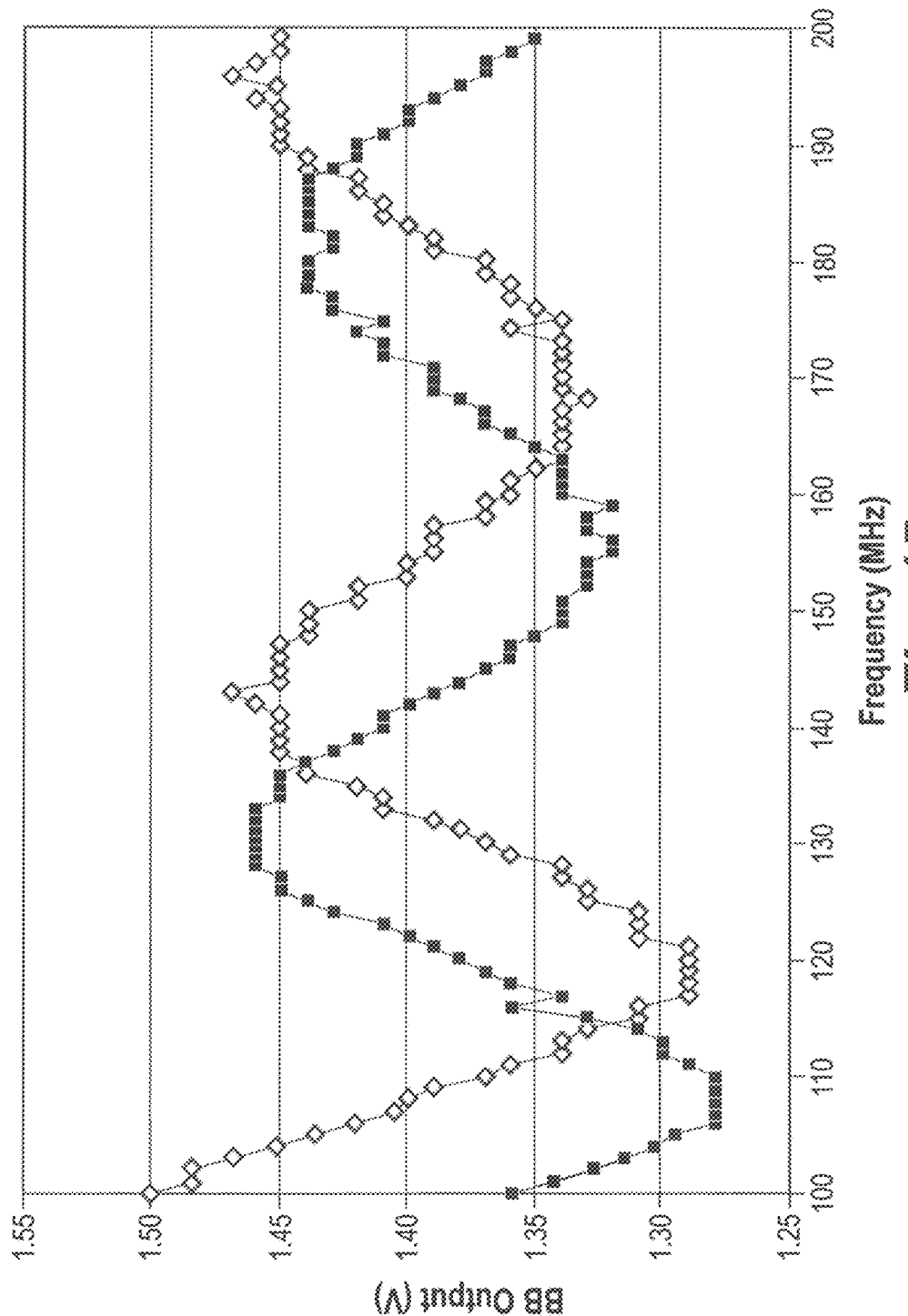
FIG. 15 includes a graph having two curves which illustrate experimental data of the FMCW envelope modulation LiDAR system according to exemplary embodiments.

FIG. 15 includes a graph having two curves which illustrate experimental data of the FMCW envelope modulation LiDAR system 200 according to exemplary embodiments. Referring to FIG. 15, the curve marked by "diamonds" or 45-degree-rotated squares is the I-channel signal, and the curve marked by upright squares is the Q-channel signal. The experiment illustrated by FIG. 15 was executed in static mode, i.e., the frequency was manually changed from 100 MHz to 200 MHz in 1.0 MHz increments, while the I-channel and Q-channel amplitude was recorded at each frequency step. The graphs of FIG. 15 illustrate quadrature signals, as expected, and an illustrative exemplary object range of approximately 3.0 meters. The range was calculated by noting the frequency change required for a full cycle ($2\pi$) of either I-channel or Q-channel and execution within the following equation (8):

$$\Delta\phi = 2\pi \cdot \frac{2R}{c} \cdot (f_2 - f_1) = 2\pi \quad (8)$$

$$\text{solving for } R = \frac{c}{2(f_2 - f_1)} = 3.0 \text{ meter}$$

In addition to a single object within the transmit optics beam width, additional objects engender additional IF frequencies directly proportional to the individual object range. A useful technique for the detection of multiple objects uses spectral resolution of the aggregate sampled data. The FFT is a computationally efficient procedure for the calculation of the Discrete Fourier Transform (DFT), which implements a set of identical filters, or a filter bank, distributed uniformly over the frequency domain at intervals of 1/NT, where T is the time interval over which N samples of a waveform have been acquired (also $\Delta T$ in this case). The FFT is particularly well suited to IF spectral resolution in FMCW radars because the narrow information bandwidth requires a filter bank which may be implemented numerically with a modest capability digital signal processor. As noted above, FIG. 9 is a schematic diagram which illustrates the filter bank attributes of the FFT, according to exemplary embodiments. The impact of the filter bank is quite significant because the signal energy from each detected object is concentrated within a single filter of the filter bank to the extent of the range resolution; and of greater significance is the reduction in the noise detection bandwidth which improves the signal-to-noise ratio. The initial noise detection bandwidth is the low-pass filter 266, 268 which follows the I-channel and Q-channel mixers with cut-off frequency established by the IF signal frequency at the maximum range as previously defined.

The processing gain of the N-point FFT is given by:

$$PG_{dB} = 10 \cdot \log\left(\frac{f_{IF\_max}}{f_s/N}\right) = 10 \cdot \log\left(\frac{f_s}{f_s/N}\right) = 10 \cdot \log(N); \quad (9)$$

Upon acquisition of I-channel and Q-channel data, the signal processing procedure, e.g., FFT, is executed, and each filter is tested for signal level and compared to a previously established threshold. The threshold test is utilized to determine the presence or absence of an object and may initiate additional techniques of object discrimination.

Figure 16:
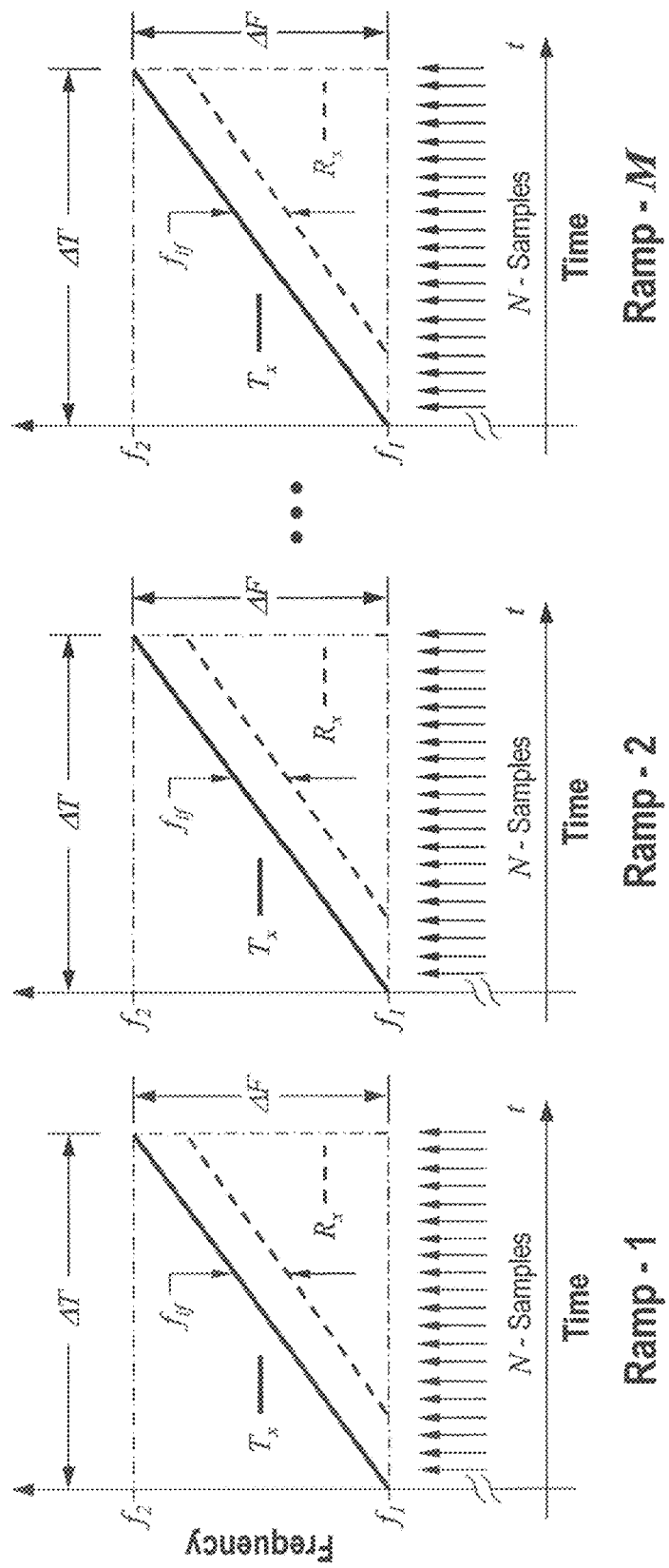
FIG. 16 includes schematic timing diagrams of multiple-frequency-ramp data acquisition for two-dimensional FFT processing, according to exemplary embodiments.

In addition to the FFT processing of a singular frequency ramp data, referred to as one-dimensional FFT, according to the exemplary embodiments, additional signal processing gain is achieved via the two-dimensional FFT procedure, where sampled data is acquired from multiple frequency ramps in order to extract object relative velocity as related to Doppler frequency and to further reduce the noise detection bandwidth and thereby provide additional processing gain. The two-dimensional FFT uses sampled data from multiple frequency ramps as illustrated in FIG. 16, which includes schematic timing diagrams of multiple-frequency-ramp data acquisition for two-dimensional FFT processing, according to exemplary embodiments.

Figure 17:
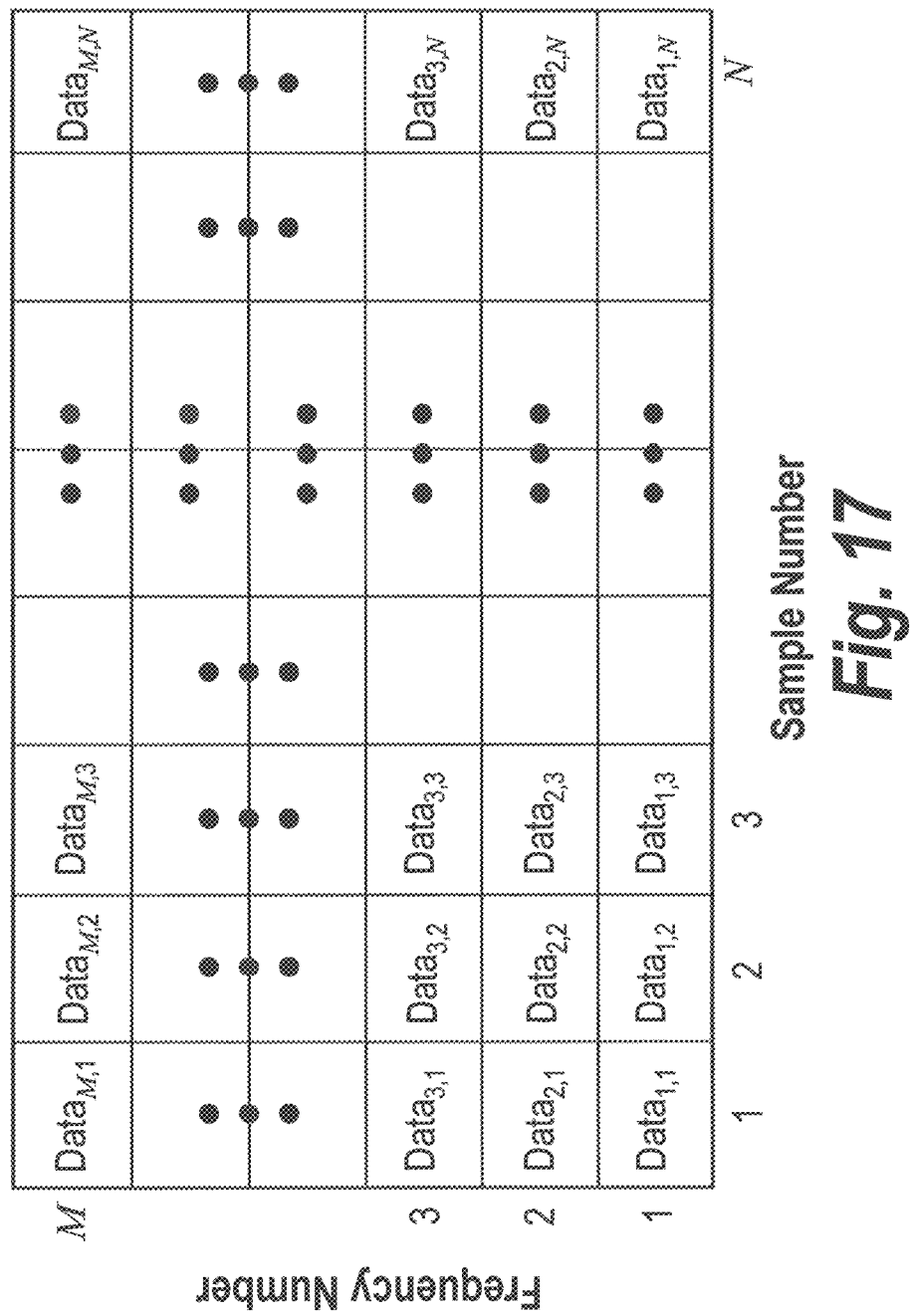
FIG. 17 includes a schematic illustration of an M×N data matrix for the two-dimensional FFT approach, which is populated by samples from each frequency ramp, according to exemplary embodiments.

The two-dimensional FFT process procedure is further illustrated in FIG. 17, which includes a schematic illustration of an M×N data matrix for the two-dimensional FFT approach, which is populated by samples from each frequency ramp, according to exemplary embodiments. Referring to FIG. 17, the range FFT may be executed on rows of the data matrix, while the Doppler FFT may be executed on columns of the data matrix. Additional processing is used to associate or identify specific objects with the appropriate Doppler frequency (velocity).

Continuing to refer to FIG. 17, according to the two-dimensional FMCW signal processing for FMCW LiDAR system 200, the data matrix is filled in a similar manner to the pulse burst LiDAR data matrix described above in detail. However, in the case of the FMCW LiDAR system 200, the rows of the data matrix are populated with samples acquired during the linear frequency ramp. The columns of the data matrix are populated from samples at discrete frequencies of the linear ramp at a fixed time following the initiation of the linear frequency ramp. The data matrix is generated from N samples from each of M frequency ramps over a frequency differential of $\Delta F = f_2 - f_1$, where $f_2 = 200$ MHz and $f_1 = 100$ MHz, in this particular exemplary embodiment. The N samples are obtained over the time interval $\Delta T$ at a sample frequency or sample rate $f_{sR}$ samples per second (SPS).

Continuing to refer to FIG. 17, in the data matrix for FMCW LiDAR system 200, the row data represents receive signal samples from each channel of the quadrature demodulator; subsequent FFT processing is referred to as the range-FFT. The column data represents received signal samples from each channel of the quadrature demodulator for the corresponding discrete time point of each frequency ramp, and is referred to as the Doppler-FFT. Two-dimensional FMCW signal processing realizes substantial signal processing gain advantages. Unlike the range-Doppler processing of pulse burst envelope modulation LiDAR 100 described above in detail, in the FMCW LiDAR system 200, the range samples require a less restrictive sampling rate, i.e., the pulse burst envelope modulation LiDAR 100 requires a minimum of one sample at each range bin, which translates to a minimum sampling rate of $1/\tau_w$; while the FMCW LiDAR system 200 requires a minimum range sampling rate in accordance with the IF frequency at the maximum operational range. Stated mathematically:

$$f_s \geq f_{IF} = \frac{2R_{max}}{c} \cdot \frac{\Delta F}{\Delta T}; \quad (10)$$

$f_s$: sampling rate $R_{max}$: maximum operational range $c$: speed of light $\Delta F$: ramp frequency deviation $\Delta T$: time of frequency ramp FIG. 18 includes a table which lists exemplary parametric data values for an exemplary illustrative operational configuration of FMCW LiDAR system 200, according to exemplary embodiments. The parametric data of FIG. 18 are presented herein as a typical road vehicle application example to serve as the basis for performance calculations. It should be emphasized that parametric data, particularly velocity, range, range resolution, data cycle time and object detection geometry, are application-specific parameters, and, therefore, large variations from the exemplary values in FIG. 18 are to be expected.

Referring to FIGS. 17 and 18, in order to achieve the maximum processing gain afforded by the two-dimensional FFT calculation, the object of detection must remain within a single range resolution cell for the duration of the data acquisition time, $T_{acq}$. For the FMCW modulation waveform, the range resolution cell is determined in accordance with the formula:

$$\delta R = \frac{c}{2 \cdot \Delta F} = \frac{3.0 \cdot 10^8}{2 \cdot 128 \cdot 10^6} = 1.17; \quad (11)$$

$\delta R$: range resolution cell (meter)

$c$: speed of light (meter/second)

$\Delta F$: frequency deviation (Hz)

At the maximum closing velocity, the object range cell dwell time may be written:

$$T_{dw} = \frac{\delta R}{v_{max}} = 0.0167; \quad (12)$$

$T_{dw}$: range cell time (second)

$v_{max}$: 70 (meter/second)

The data acquisition time is the time required to fill the data matrix and may be written:

$$T_{acq} = M \cdot \Delta T = 0.0168; \quad (13)$$

$T_{acq}$: data acquisition time (second)

M: number of frequency ramps $\Delta T$: frequency ramp time (second)

A comparison of the range cell object dwell time and data acquisition time indicates compliance with the condition for optimum processing gain.

The minimum number of range samples affects the range signal processing gain and is limited by the IF frequency at maximum operational range in accordance with the equation:

$$f_{if\_max} = \frac{2R_{max}}{c} \cdot \frac{\Delta F}{\Delta T} = 1.0 \cdot 10^6; \quad (14)$$

$f_{if\_max_{max}}$: IF frequency at maximum range (Hz)

$R_{max}$: maximum operational range (meter)

Therefore, the minimum number of samples may be found via the following equation (15):

$$N_{min} = f_{if\_max} \cdot \Delta T = 128 \quad (15)$$

It is noted that for additional processing gain, the sample rate may be increased. In that case, ADCs 270, 272 would be capable of the higher sampling rate without compromising performance. For the illustrative exemplary embodiments, the number of samples has been increased to provide greater processing gain, particularly for the condition in which the object straddles an adjacent range bin. The number of samples and the range sampling rate for the illustrative example may now be written:

N=256 samples per frequency ramp $$f_{sR} = 2.0 \cdot 10^6 \text{ samples per second} \quad (16)$$

Continuing with the parametric definitions and numerical analysis, the maximum Doppler frequency may be calculated from a knowledge of the nominal envelope modulation wavelength/frequency and the maximum velocity:

$$f_{D\_max} = \frac{2 \cdot v_{max}}{\lambda_m} = 2 \cdot v_{max} \frac{f_m}{c} = 466; \quad (17)$$

$f_{D\_max}$: maximum Doppler Frequency (Hz)

$\lambda_m$: modulation wavelength (meter)

$f_m$: modulation frequency (Hz)

In some exemplary embodiments, the modulation frequency is generally limited by the laser modulator, and is typically less than 2 GHz for low cost modulators; although significantly higher frequency laser modulators have been reported.

It is beneficial to calculate the noise detection bandwidth for both range and Doppler parameters, as indicated below in equations (18). The range and Doppler bandwidths are significant in the detection process because the noise level is determined by their values.

$$B_{wR} = \frac{f_{sR}}{N} = 7812.5; \quad (18)$$

$B_{wR}$: FFT range bandwidth (Hz)

$f_{sR}$: range sample rate (samples/second)

N: number of range samples;

$$B_{wD} = \frac{f_{sD}}{M} = \frac{1}{M \cdot \Delta T} = 61;$$

$f_{sD}$: Doppler sample rate (samples/second)

M: number of Doppler samples

It is noted that the ratio of the range sample rate to the Doppler sample rate provides the Doppler processing gain estimate, and is in addition to the range signal processing gain.

The processing gain for the range and Doppler FFT may be estimated using the following equations (19):

$PG_{R\_dB} = 10 \cdot \log(N) = 24.1$ dB $$PG_{D\_dB} = 10 \cdot \log(M) = 21.1 \text{ dB} \quad (19)$$

Significant elements of the exemplary embodiments include the change in transmission phase shift of the envelope modulation waveform over the two-way range to the object, and coherent detection of the envelop modulation waveform within the quadrature demodulator. The local oscillator for the quadrature demodulator is also the source of the envelope modulation signal.

A fundamental feature of transmitter envelope modulation according to the exemplary embodiments is that upon transmission, the modulation envelope is subject to phase delay in accordance with the envelope modulation frequency.

Upon recovery of the modulation envelope in the photo detector diode, the amplitude and transmission phase of the modulation envelope are detected within the quadrature demodulator.

According to the exemplary embodiments, the total transmission phase shift in the two-way range from LiDAR to object is described by the following equation (20):

$$\Delta\phi = 2\pi\frac{2R}{\lambda}; \quad (20)$$

$\Delta\phi$: transmission phase shift $R$: range to object $\lambda$: envelope modulation wavelength According to the exemplary embodiments, the mathematical development of Doppler frequency follows:

$$R = 2(R_o + v \cdot t) \quad (21)$$

$R_o$ fixed range to object $v \cdot t$ is the change in range, i.e. the velocity·time product upon substitution $$\Delta\phi = 2\pi\frac{2R_o}{\lambda_{mod}} + 2\pi\frac{2v \cdot t}{\lambda_{mod}}$$

Doppler frequency is defined: $f_{Doppler} = \frac{1}{2\pi}\frac{d\Delta\phi}{dt}$ executing the differential $f_{Doppler} = \frac{2 \cdot v}{\lambda_{mod}}$ Throughout the present Detailed Description, embodiments have been described in which the envelope modulation waveform varies linearly with a positive frequency/ramp slope, that is, with the frequency of the envelope modulation increasing with time in a linear ramp function, such as that illustrated in FIG. 12D. It will be understood that the present disclosure is also applicable to linear ramp envelope modulation waveforms which have a negative slope as well, that is, an envelope modulation in which the frequency of the envelope decreases over time instead of increases.

Figure 20:
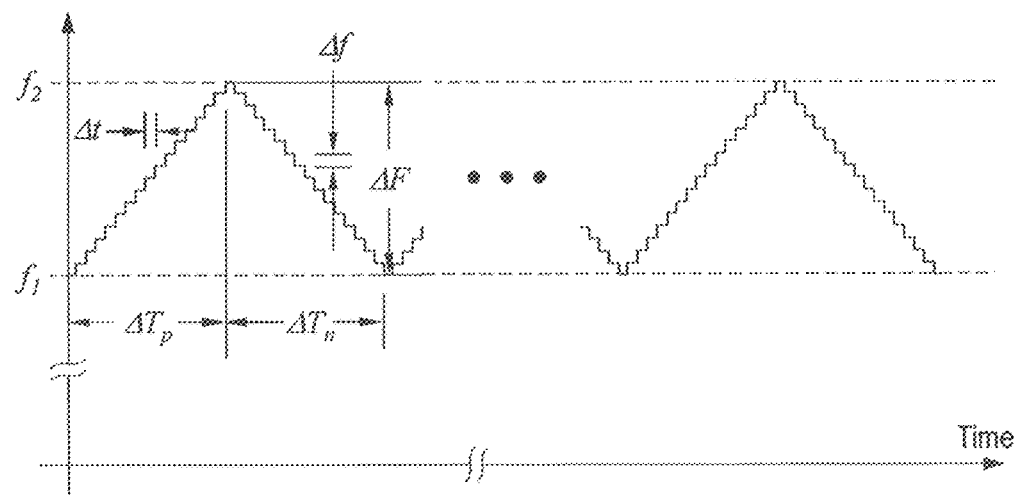
FIG. 20 is a schematic timing diagram of the frequency deviation versus time for a step frequency ramp envelope modulation waveform, according to exemplary embodiments.
Figure 21:
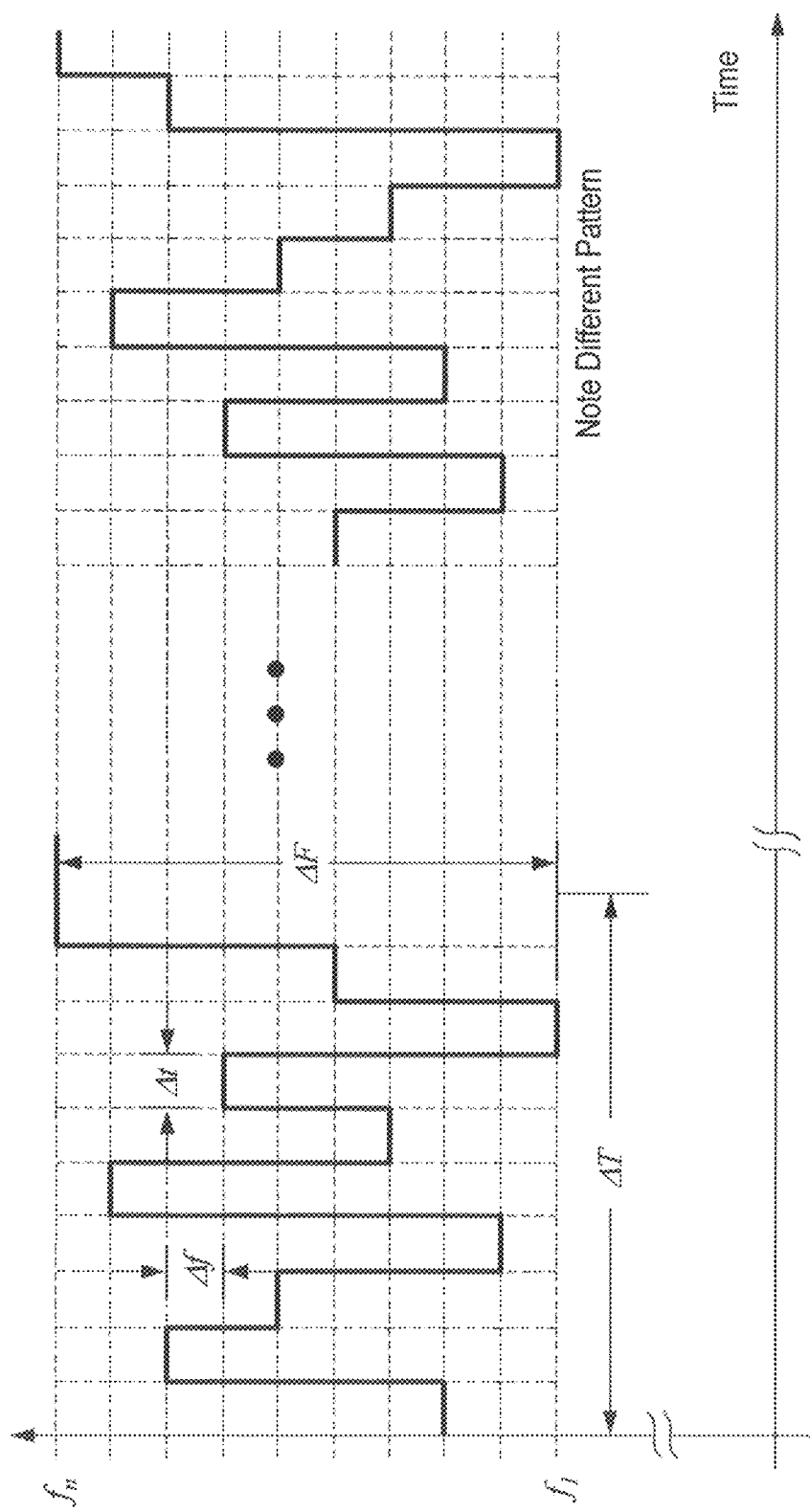
FIG. 21 is a schematic timing diagram of the frequency deviation versus time for a pseudo-random step frequency envelope modulation waveform, according to exemplary embodiments.

Furthermore, in addition to the linear ramp FMCW waveforms described in detail herein, the present disclosure is also applicable to other alternate envelope modulation waveforms, which offer some flexibility and in some cases, unique operational advantages. Such alternate envelope modulation waveforms can include, positive/negative linear frequency ramp envelope modulation waveforms, step-frequency ramp envelope modulation waveforms, and pseudo-random envelope frequency modulation (FM) waveforms. Examples of these waveforms are illustrated in FIGS. 19, 20 and 21, respectively.

Figure 19:
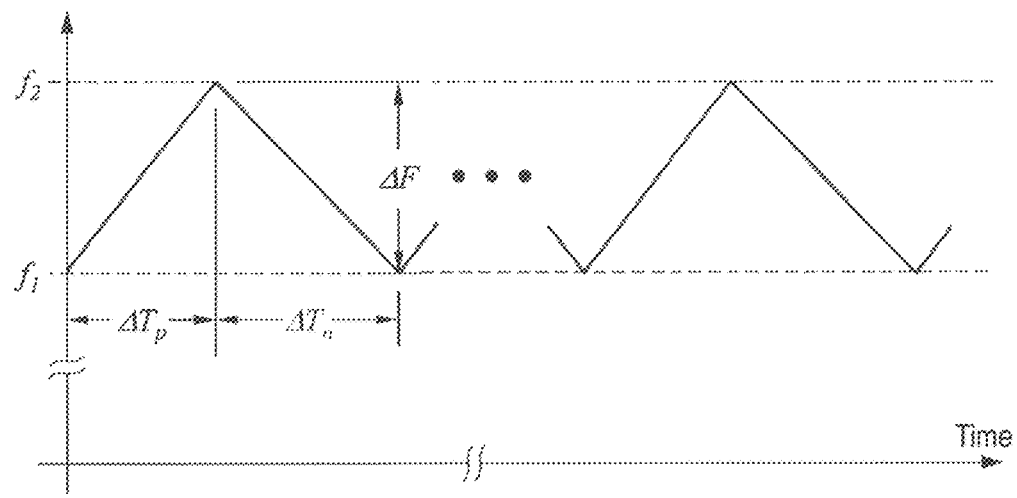
FIG. 19 is a schematic timing diagram of the frequency deviation versus time for a linear frequency ramp envelope modulation waveform having a combination of positive and negative frequency/time ramp envelope modulation slope, according to exemplary embodiments.

FIG. 19 is a schematic timing diagram of the frequency deviation versus time for a linear frequency ramp envelope modulation waveform having a combination of positive and negative frequency/time ramp envelope modulation slope, according to exemplary embodiments. Referring to FIG. 19, positive and negative frequency ramps are used together with equal or unequal time duration. When the positive and negative ramps are deployed collectively, Doppler frequency measurement can be implemented in accordance with the following. With reference to the equation for the IF frequency at the I-Ch and Q-Ch outputs 205, 207 of LiDAR system 200 illustrated in the block diagram of FIG. 11:

$$f_{if} = \frac{2R}{c} \cdot \frac{\Delta F}{\Delta T} \quad (22)$$

The range to the object is variable and may be written as a function of time:

$$R = R_o + v \cdot t \quad (23)$$

Upon substitution for the variable range, the IF equation may be written:

$$f_{if} = \frac{2(R_o + v \cdot t)}{c} \cdot \frac{\Delta F}{\Delta T} = \frac{2 \cdot R_o}{c} \cdot \frac{\Delta F}{\Delta T} + \frac{2 \cdot v \cdot t}{c} \cdot \frac{\Delta F}{\Delta T} \quad (24)$$

Therefore, the IF frequency includes two components: a component at the start of the ramp due to the initial range ($R_o$); and a component due to the change in range due to relative velocity, ($v \cdot t$). The positive or negative slope of the ramp imparts a positive or negative offset to the IF frequency, which, upon spectral resolution of the acquired data set during each frequency ramp, provides the Doppler frequency.

FIG. 20 is a schematic timing diagram of the frequency deviation versus time for a step frequency ramp envelope modulation waveform, according to exemplary embodiments. A difference between the linear frequency ramp and the step frequency ramp is the time dwell at discrete frequency points.

According to the exemplary embodiments, parametric operational considerations for the step frequency ramp are made. For example, in some exemplary embodiments, the frequency step ($\Delta f$) does not exceed the value which engenders a two-way phase shift of greater than $2\pi$ at the maximum range of operation. The condition may be mathematically illustrated by the following equations (25):

$$\Delta\phi = 2\pi\frac{2 \cdot R_{max}}{c} \cdot \Delta f \leq 2\pi \quad (25)$$

$$\text{or } \Delta f \leq \frac{c}{2 \cdot R_{max}};$$

$\Delta f$: maximum frequency step (Hz)

$c$ speed of light (meter/second)

$R_{max}$: maximum operational range (meter), e.g., if $R_{max} = 150$ meter, $\Delta f \leq 1.0 \cdot 10^6$ Hz Also, besides the maximum frequency step increment, the frequency dwells at a fixed value for a time increment greater than the two-way time of flight to the target at the maximum range of operation. Expressed mathematically in equations (26):

$$\Delta t \geq \frac{2 \cdot R_{max}}{c}, \quad (26)$$

e.g., if $R_{max} = 150$ meter, $\Delta t \geq 1.0 \cdot 10^{-6}$

FIG. 21 is a schematic timing diagram of the frequency deviation versus time for a pseudo-random step frequency envelope modulation waveform, according to exemplary embodiments. The pseudo-random step frequency envelop modulation waveform is similar in some respects to the step frequency waveform illustrated in FIG. 20 and has similar restrictions with qualifications.

Referring to FIG. 21, the frequency is pseudo-randomly stepped over the time interval in a manner which allocates a single frequency of the composite linear ramp to a known time position. Additional processing is performed to assemble the acquired data points in a manner which reconstructs the linear frequency ramp. The pseudo-random pattern may be fixed, or the pattern may be altered in each time interval. It is noted that the same restrictions on the magnitude of the frequency and time increments are used for the pseudo-random frequency step waveform. The pseudo-random frequency step waveform is particularly useful within an environment in which multiple LiDAR systems are operational and interference is to be mitigated.

Figure 22:
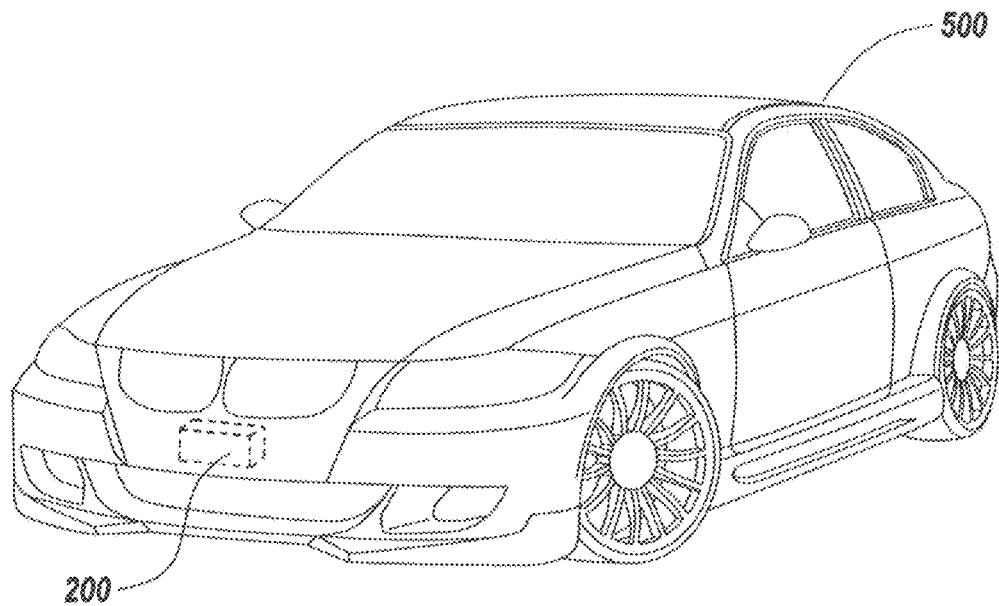
FIG. 22 includes a schematic perspective view of an automobile equipped with one or more LiDAR systems described herein in detail, according to exemplary embodiments.

FIG. 22 includes a schematic perspective view of an automobile 500, equipped with one or more LiDAR systems 200, described herein in detail, according to exemplary embodiments. Referring to FIG. 22, it should be noted that, although only a single LiDAR system 200 is illustrated, it will be understood that multiple LiDAR systems 200 according to the exemplary embodiments can be used in automobile 500. Also, for simplicity of illustration, LiDAR system 200 is illustrated as being mounted on or in the front section of automobile 500. It will also be understood that one or more LiDAR systems 200 can be mounted at various locations on automobile 500.

Figure 23:
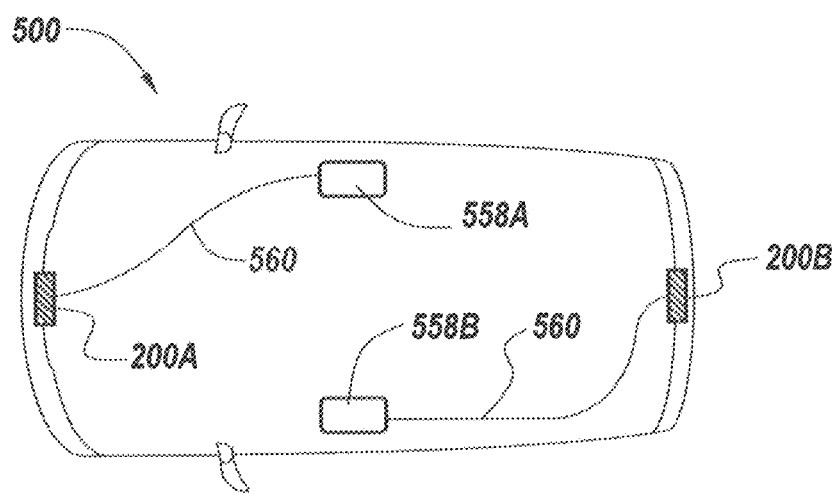
FIG. 23 includes a schematic top view of an automobile equipped with two LiDAR systems as described herein in detail, according to exemplary embodiments.

FIG. 23 includes a schematic top view of automobile 500 equipped with two LiDAR systems 200, as described above in detail, according to exemplary embodiments. In the particular embodiments illustrated in FIG. 23, a first LiDAR system 200A is connected via a bus 560, which in some embodiments can be a standard automotive controller area network (CAN) bus, to a first CAN bus electronic control unit (ECU) 558A. Detections generated by the LiDAR processing described herein in detail in LiDAR system 500A can be reported to ECU 558A, which processes the detections and can provide detection alerts via CAN bus 560. Similarly, in some exemplary embodiments, a second LiDAR system 500B is connected via CAN bus 560 to a second CAN bus electronic control unit (ECU) 558B. Detections generated by the LiDAR processing described herein in detail in LiDAR system 500B can be reported to ECU 558B, which processes the detections and can provide detection alerts via CAN bus 560. It should be noted that this configuration is exemplary only, and that many other automobile LiDAR configurations within automobile 500 can be implemented. For example, a single ECU can be used instead of multiple ECUs. Also, the separate ECUs can be omitted altogether.

According to the exemplary embodiments described herein in detail, transmitter envelope modulation and receiver quadrature demodulation techniques are applied to direct detection LiDAR systems. The technique of transmit envelope modulation in conjunction with receive quadrature demodulation as applied to direct detection LiDAR systems is demonstrated to provide signal processing gain as determined by the increase in the signal-to-noise ratio at the system detection stage. Significant operational factors in connection with the exemplary embodiments include the change in transmission phase shift of the envelope modulation waveform over the two-way range to the object, and coherent detection of the envelope modulation waveform within the quadrature demodulator. In addition, in exemplary embodiments, the envelope modulation waveform is derived from the quadrature demodulation local oscillator, thereby establishing the coherent signal used for detection.

The achievement of signal processing gain in direct detection LiDAR systems according to the present disclosure far exceeds the modest increase in hardware complexity. The availability of integrated circuit phase-locked loop and quadrature demodulation functions provides ease of implementation with minimum impact to system volume, operating power and cost. Also, the LiDAR architecture described in detail herein provides systems with lower transmit power, longer measurement range, reduced power consumption and better performance in multiple-system deployment conditions.

The experimental data indicates further opportunities to exploit the signal processing gain. Additional modulation and coding waveforms are considered with system performance objectives of increased processing gain, measurement accuracy and spatial resolution.

It is noted that the present disclosure describes a LiDAR system installed in an automobile. It will be understood that the system of the disclosure is applicable to any kind of vehicle, e.g., bus, train, etc., or the LiDAR system of the present disclosure need not be associated with any kind of vehicle.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A LiDAR system, comprising:
a signal generator for generating an output signal having a variable frequency;
a modulation circuit for receiving the output signal from the signal generator and applying the output signal from the signal generator to an optical signal to generate an envelope-modulated optical signal having a frequency-modulated modulation envelope;
optical transmission elements for transmitting the envelope-modulated optical signal into a region;
optical receiving elements for receiving reflected optical signals from the region; and
receive signal processing circuitry for receiving the reflected optical signals and using quadrature detection to process the reflected optical signals, wherein the receive signal processing circuitry includes phase shifting circuitry for splitting the output signal from the signal generator into a pair of split signals and applying a phase shift to one of the pair of split signals to generate a first LO signal and a second phase-shifted LO signal, the first LO signal and the second phase shifted LO signal being applied to respective second inputs of respective ones of the pair of I/O mixers.

2. The LiDAR system of claim 1, wherein the signal generator comprises a voltage-controlled oscillator (VCO), the frequency of the output signal being variable by a control input applied to the VCO.

3. The LiDAR system of claim 1, wherein the frequency of the output signal is controlled to vary according to a ramp between a first frequency and a second frequency.

4. The LiDAR system of claim 3, wherein the ramp is a linear ramp.

5. The LiDAR system of claim 3, wherein the ramp comprises a plurality of frequency steps between the first and second frequencies.

6. The LiDAR system of claim 5, wherein the plurality of frequency steps increases in frequency from the first frequency to the second frequency.

7. The LiDAR system of claim 5, wherein the plurality of frequency steps decreases in frequency from the first frequency to the second frequency.

8. The LiDAR system of claim 5, wherein the plurality of frequency steps varies in frequency in a pseudo-random fashion between the first frequency and the second frequency.

9. The LiDAR system of claim 3, wherein the first frequency is lower than the second frequency.

10. The LiDAR system of claim 3, wherein the first frequency is higher than the second frequency.

11. The LiDAR system of claim 1, wherein the frequency of the output signal is controlled to vary according to a series of linear ramps between a first frequency and a second frequency.

12. The LiDAR system of claim 11, wherein the first frequency is lower than the second frequency.

13. The LiDAR system of claim 1, wherein the receive signal processing circuitry includes a pair of I/Q mixers, each of the pair of I/Q mixers receiving a pulse modulation envelope signal and providing the pulse modulation envelope signal to respective analog-to-digital converter circuits.

14. The LiDAR system of claim 1, wherein the phase shift is 90 degrees, such that the first LO signal and the second phase-shifted LO signal are in quadrature.

15. The LiDAR system of claim 1, wherein the output signal is a substantially sinusoidal signal.

16. The LiDAR system of claim 1, wherein the LiDAR system is installed and operates in an automobile.

* * * * *